(12) United States Patent
Groden et al.

(10) Patent No.: US 10,535,272 B2
(45) Date of Patent: Jan. 14, 2020

(54) SYSTEM AND METHOD FOR SITUATIONAL AWARENESS, VEHICLE CONTROL, AND/OR CONTINGENCY PLANNING

(71) Applicant: SkyRyse, Inc., San Francisco, CA (US)

(72) Inventors: Mark Groden, San Francisco, CA (US); Mitch Adler, San Francisco, CA (US); Jonathan Reeves, San Francisco, CA (US); Nur Harell, San Francisco, CA (US); Christopher Ward, San Francisco, CA (US)

(73) Assignee: Skyryse, Inc., Hawthorne, CA (US)

( * ) Notice: Subject to any disclaimer, the term of this patent is extended or adjusted under 35 U.S.C. 154(b) by 0 days.

(21) Appl. No.: 16/044,810

(22) Filed: Jul. 25, 2018

(65) Prior Publication Data

US 2019/0033862 A1     Jan. 31, 2019

Related U.S. Application Data

(60) Provisional application No. 62/537,691, filed on Jul. 27, 2017, provisional application No. 62/544,161, (Continued)

(51) Int. Cl.
*B64D 25/00* (2006.01)
*G08G 5/00* (2006.01)
(Continued)

(52) U.S. Cl.
CPC ........... *G08G 5/0056* (2013.01); *B64C 27/57* (2013.01); *B64D 17/80* (2013.01); *B64D 19/02* (2013.01);
(Continued)

(58) Field of Classification Search
CPC .... G05D 1/0072; G05D 1/105; G05D 1/0088; G05D 1/0055; B64D 25/00;
(Continued)

(56) References Cited

U.S. PATENT DOCUMENTS 3,455,182 A    7/1969 Kelley
3,747,877 A    7/1973 Drew
(Continued)

FOREIGN PATENT DOCUMENTS

FR         3003844 A1   10/2014
WO    2017064717 A1    4/2017

OTHER PUBLICATIONS

International Search Report and Written Opinion for International Application No. PCT/US18/19547 dated Jul. 20, 2018.
(Continued)

*Primary Examiner* — Nadeem Odeh
*Assistant Examiner* — Michael V Kerrigan
(74) *Attorney, Agent, or Firm* — Jeffrey Schox

(57) ABSTRACT

A method, preferably including: sampling inputs, determining aircraft conditions, and/or acting based on the aircraft conditions. A method, preferably including: sampling inputs, determining input reliability, determining guidance, and/or controlling aircraft operation. A method, preferably including: operating the vehicle, planning for contingencies, detecting undesired flight conditions, and/or reacting to undesired flight conditions. A system, preferably an aircraft such as a rotorcraft, configured to implement the method.

20 Claims, 11 Drawing Sheets

Related U.S. Application Data filed on Aug. 11, 2017, provisional application No. 62/544,172, filed on Aug. 11, 2017, provisional application No. 62/607,230, filed on Dec. 18, 2017, provisional application No. 62/634,719, filed on Feb. 23, 2018.

(51) Int. Cl.
| | |
|---|---|
| *G05D 1/00* | (2006.01) |
| *G05D 1/10* | (2006.01) |
| *G08G 5/02* | (2006.01) |
| *B64C 27/57* | (2006.01) |
| *B64D 17/80* | (2006.01) |
| *B64D 19/02* | (2006.01) |
| *B64D 45/00* | (2006.01) |

(52) U.S. Cl.
CPC ........... *B64D 25/00* (2013.01); *G05D 1/0055* (2013.01); *G05D 1/0072* (2013.01); *G05D 1/0088* (2013.01); *G05D 1/105* (2013.01); *G08G 5/0039* (2013.01); *G08G 5/025* (2013.01); *B64D 2045/0085* (2013.01)

(58) Field of Classification Search
CPC ............... B64D 2045/0085; B64D 17/80; B64D 19/02; G08G 5/025; G08G 5/0056; G08G 5/0039; B64C 13/16; B64C 27/57
See application file for complete search history.

(56) References Cited

U.S. PATENT DOCUMENTS

| | | | |
|---|---|---|---|
| 3,995,793 A | 12/1976 | Wing | |
| 4,500,966 A | 2/1985 | Zagranski et al. | |
| 4,676,457 A | 6/1987 | Allen | |
| 4,709,881 A | 12/1987 | Rafikian et al. | |
| 4,957,121 A | 9/1990 | Icenogle et al. | |
| 5,403,155 A | 4/1995 | Head et al. | |
| 5,493,309 A | 2/1996 | Bjornholt | |
| 6,115,373 A | 9/2000 | Lea | |
| 6,739,556 B1 | 5/2004 | Langston | |
| 6,775,373 B2 | 8/2004 | Stoughton | |
| 6,776,373 B1 | 8/2004 | Talmage | |
| 7,032,860 B1 | 4/2006 | Kirk et al. | |
| 7,059,570 B2 | 6/2006 | Strong | |
| 7,143,973 B2 | 12/2006 | Ballew | |
| 7,377,468 B2 | 5/2008 | Saggio et al. | |
| 7,458,544 B1 | 12/2008 | Sarigul-Klijn | |
| 7,487,939 B1 | 2/2009 | Christof | |
| 7,523,892 B2 | 4/2009 | Cook | |
| 7,611,090 B2 | 11/2009 | Oleshchuk et al. | |
| 8,018,079 B2 | 9/2011 | Kelly | |
| 8,033,507 B2 | 10/2011 | Fox | |
| 8,399,816 B2 | 3/2013 | Glasson | |
| 8,453,962 B2 | 6/2013 | Shaw | |
| 8,521,340 B2 | 8/2013 | Coulmeau | |
| 8,868,258 B2 | 10/2014 | Papadopoulos et al. | |
| 8,948,935 B1 | 2/2015 | Peeters et al. | |
| 8,979,031 B2 | 3/2015 | Fox | |
| 8,979,032 B1 | 3/2015 | Hester et al. | |
| 9,158,304 B2 | 10/2015 | Fleck | |
| 9,199,742 B2 | 12/2015 | Giannakopoulos | |
| 9,257,048 B1 | 2/2016 | Offer et al. | |
| 9,308,970 B1 | 4/2016 | Gefken et al. | |
| 9,319,913 B2 | 4/2016 | Raleigh et al. | |
| 9,645,582 B2 | 5/2017 | Shue | |
| 9,786,187 B1 | 10/2017 | Bar-Zeev et al. | |
| 9,849,044 B1 | 12/2017 | Groden et al. | |
| 9,868,526 B2 | 1/2018 | Yates | |
| 2003/0094537 A1 | 5/2003 | Austen-Brown | |
| 2005/0087652 A1 | 4/2005 | Holmboe | |
| 2005/0127238 A1 | 6/2005 | Ballew | |
| 2005/0139363 A1 | 6/2005 | Thomas | |
| 2005/0230529 A1 | 10/2005 | Towne | |
| 2005/0230555 A1 | 10/2005 | Strong | |
| 2006/0032984 A1 | 2/2006 | Preston | |
| 2006/0106506 A1* | 5/2006 | Nichols ................. G05D 1/101 |
| | | | 701/3 |
| 2006/0208136 A1 | 9/2006 | Cook | |
| 2007/0055434 A1 | 3/2007 | Kohlmann | |
| 2007/0138345 A1 | 6/2007 | Shuster | |
| 2007/0164167 A1 | 7/2007 | Bachelder et al. | |
| 2007/0262203 A1 | 11/2007 | Saggio et al. | |
| 2008/0167763 A1 | 7/2008 | Duranti et al. | |
| 2009/0008499 A1 | 1/2009 | Shaw | |
| 2009/0105890 A1 | 4/2009 | Jones et al. | |
| 2010/0108817 A1 | 5/2010 | Fox | |
| 2010/0213718 A1 | 8/2010 | Kelly | |
| 2010/0219987 A1* | 9/2010 | Isom .................... G07C 5/0816 |
| | | | 340/946 |
| 2011/0009053 A1 | 1/2011 | Anglin et al. | |
| 2011/0035149 A1 | 2/2011 | McAndrew et al. | |
| 2011/0264312 A1 | 10/2011 | Spinelli et al. | |
| 2012/0011996 A1 | 1/2012 | Glasson | |
| 2012/0228432 A1 | 9/2012 | Fox | |
| 2013/0221153 A1 | 8/2013 | Worsham et al. | |
| 2013/0221159 A1 | 8/2013 | Giannakopoulos | |
| 2014/0067164 A1 | 3/2014 | Papadopoulos et al. | |
| 2014/0117148 A1 | 5/2014 | Dyrla et al. | |
| 2014/0129951 A1 | 5/2014 | Amin et al. | |
| 2014/0140871 A1 | 5/2014 | Grieser | |
| 2014/0343765 A1 | 11/2014 | Suiter et al. | |
| 2015/0148988 A1 | 5/2015 | Fleck | |
| 2015/0203200 A1 | 7/2015 | Bye et al. | |
| 2015/0323931 A1 | 11/2015 | Downey et al. | |
| 2016/0052626 A1 | 2/2016 | Vander Mey | |
| 2016/0055754 A1 | 2/2016 | Ling et al. | |
| 2016/0107750 A1 | 4/2016 | Yates | |
| 2016/0240091 A1 | 8/2016 | Thiele et al. | |
| 2016/0274577 A1 | 9/2016 | Heinonen | |
| 2016/0318615 A1 | 11/2016 | Pick | |
| 2016/0357192 A1 | 12/2016 | McGrew et al. | |
| 2016/0378121 A1 | 12/2016 | Shue | |
| 2017/0003681 A1 | 1/2017 | Ross et al. | |
| 2017/0274994 A1 | 9/2017 | Eller et al. | |
| 2017/0369160 A1 | 12/2017 | White et al. | |
| 2018/0065738 A1 | 3/2018 | Lappos et al. | |
| 2018/0129226 A1 | 5/2018 | Rogers et al. | |
| 2018/0214324 A1 | 8/2018 | Groden et al. | |
| 2018/0225976 A1* | 8/2018 | Rinehart ................. G06N 7/005 |
| 2018/0251122 A1* | 9/2018 | Golston .............. B60W 30/025 |

OTHER PUBLICATIONS

International Search Report and Written Opinion for PCT Application No. PCT/US18/20149 dated May 16, 2018.

* cited by examiner

SYSTEM AND METHOD FOR SITUATIONAL AWARENESS, VEHICLE CONTROL, AND/OR CONTINGENCY PLANNING

CROSS-REFERENCE TO RELATED APPLICATIONS

This application claims the benefit of U.S. Provisional Application Ser. No. 62/537,691, filed on 27 Jul. 2017, U.S. Provisional Application Ser. No. 62/544,161, filed on 11 Aug. 2017, U.S. Provisional Application Ser. No. 62/544,172, filed on 11 Aug. 2017, U.S. Provisional Application Ser. No. 62/607,230, filed on 18 Dec. 2017, and U.S. Provisional Application Ser. No. 62/634,719, filed on 23 Feb. 2018, each of which is incorporated in its entirety by this reference.

TECHNICAL FIELD

This invention relates generally to the vehicle field, and more specifically to a new and useful system and method for situational awareness and/or vehicle control.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
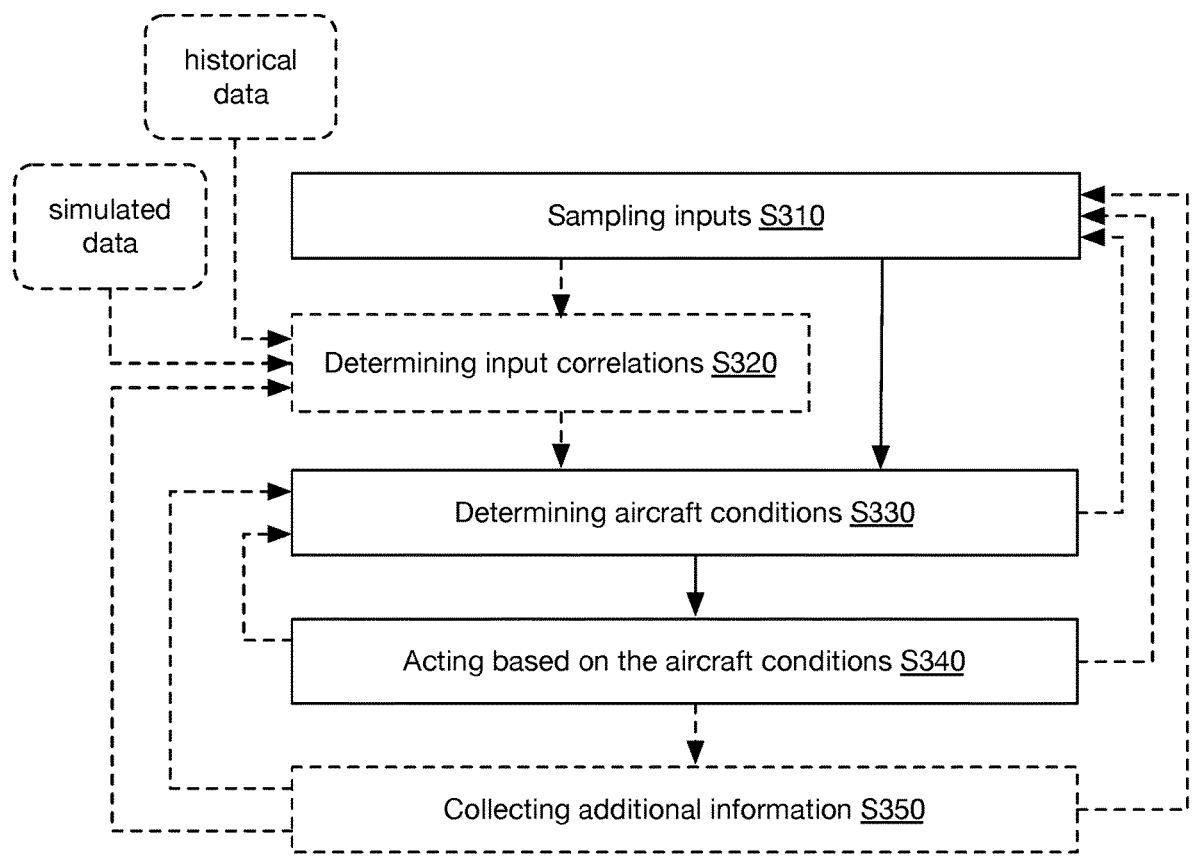
FIG. 1 is a flow chart representation of a first embodiment of the method.
Figure 2:
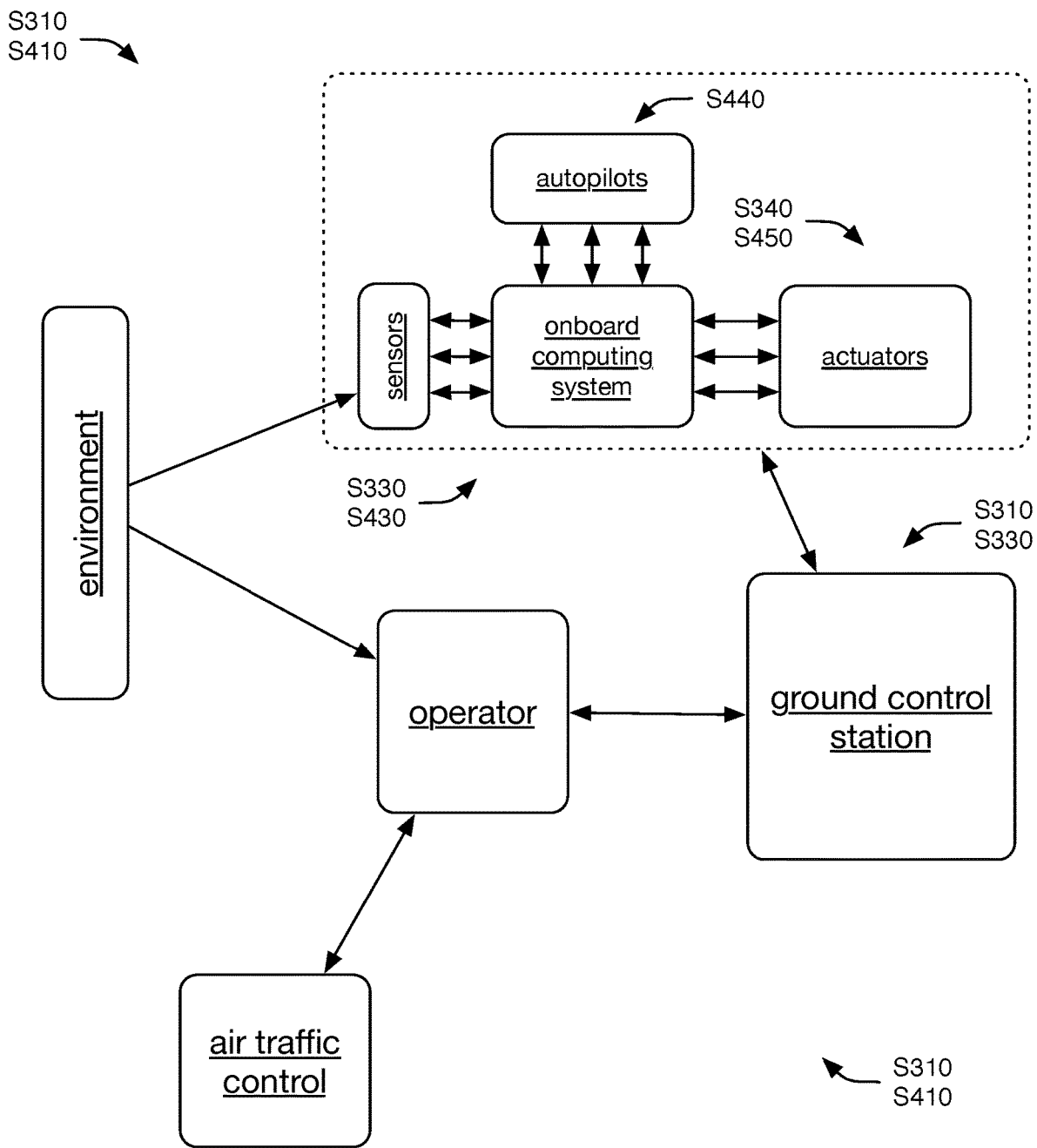
FIG. 2 is a schematic representation of a first variation of the system and method.
Figure 5:
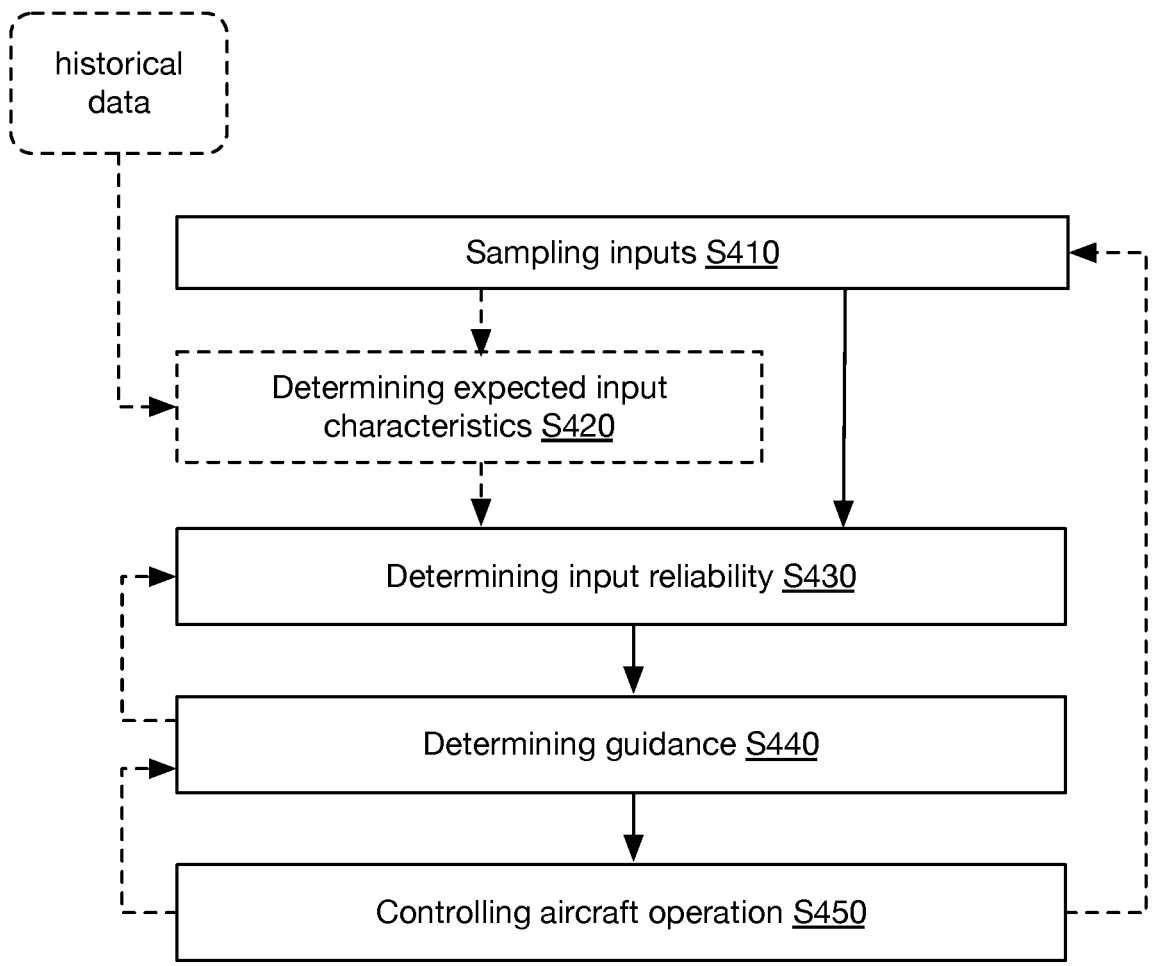
FIG. 5 is a flow chart representation of a second embodiment of the method.
Figure 6:
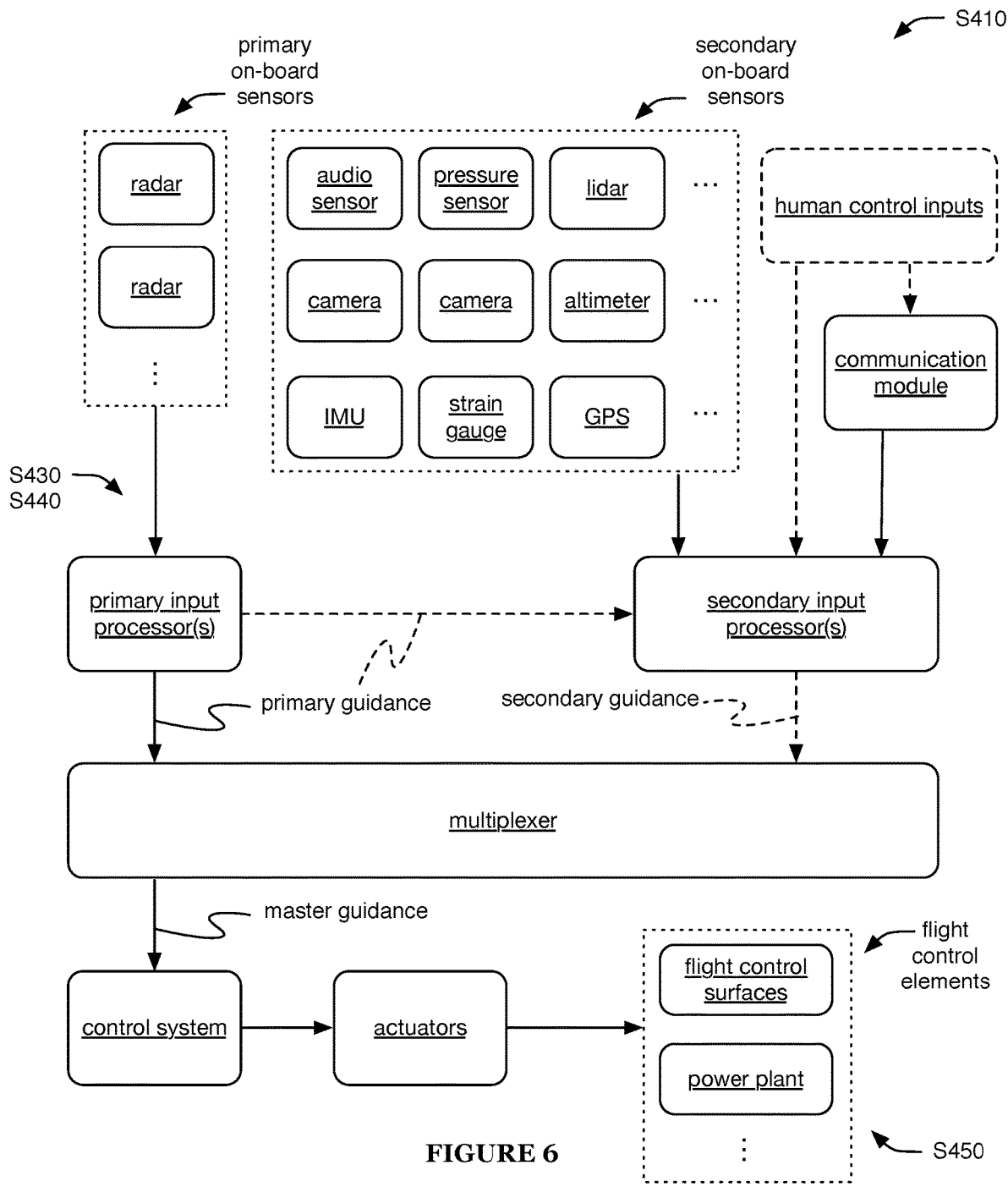
FIG. 6 is a schematic representation of a second variation of the system and method.
Figure 7:
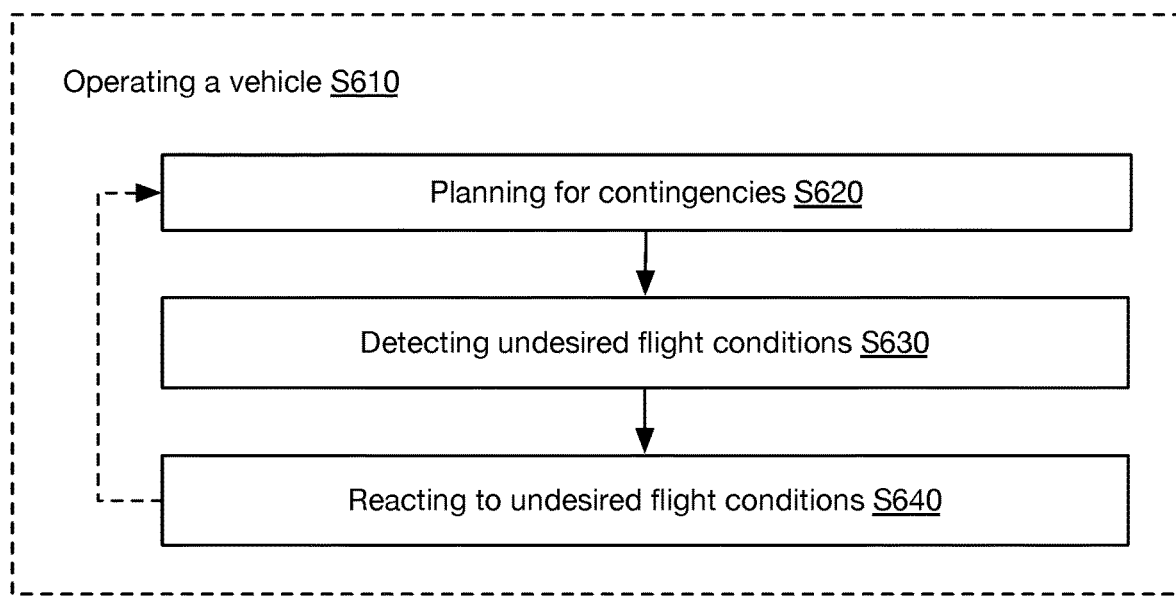
FIG. 7 is a flow chart representation of a third embodiment of the method.

An embodiment 3 of a method (e.g., for situational awareness) preferably includes sampling inputs S310, determining aircraft conditions S330, and acting based on the aircraft conditions S340, and can optionally include determining input correlations S320 and/or collecting additional information S350 (e.g., as shown in FIGS. 1-2). An embodiment 4 of the method (e.g., for vehicle control) preferably includes sampling inputs S410, determining input reliability S430, determining guidance S440, and controlling aircraft operation S450, and can optionally include determining expected input characteristics S420 (e.g., as shown in FIGS. 5-6). An embodiment 6 of the method (e.g., for contingency planning) preferably includes operating the vehicle S610, planning for contingencies S620, detecting undesired flight conditions S630, and reacting to undesired flight conditions S640 (e.g., as shown in FIG. 7).

Figure 11:
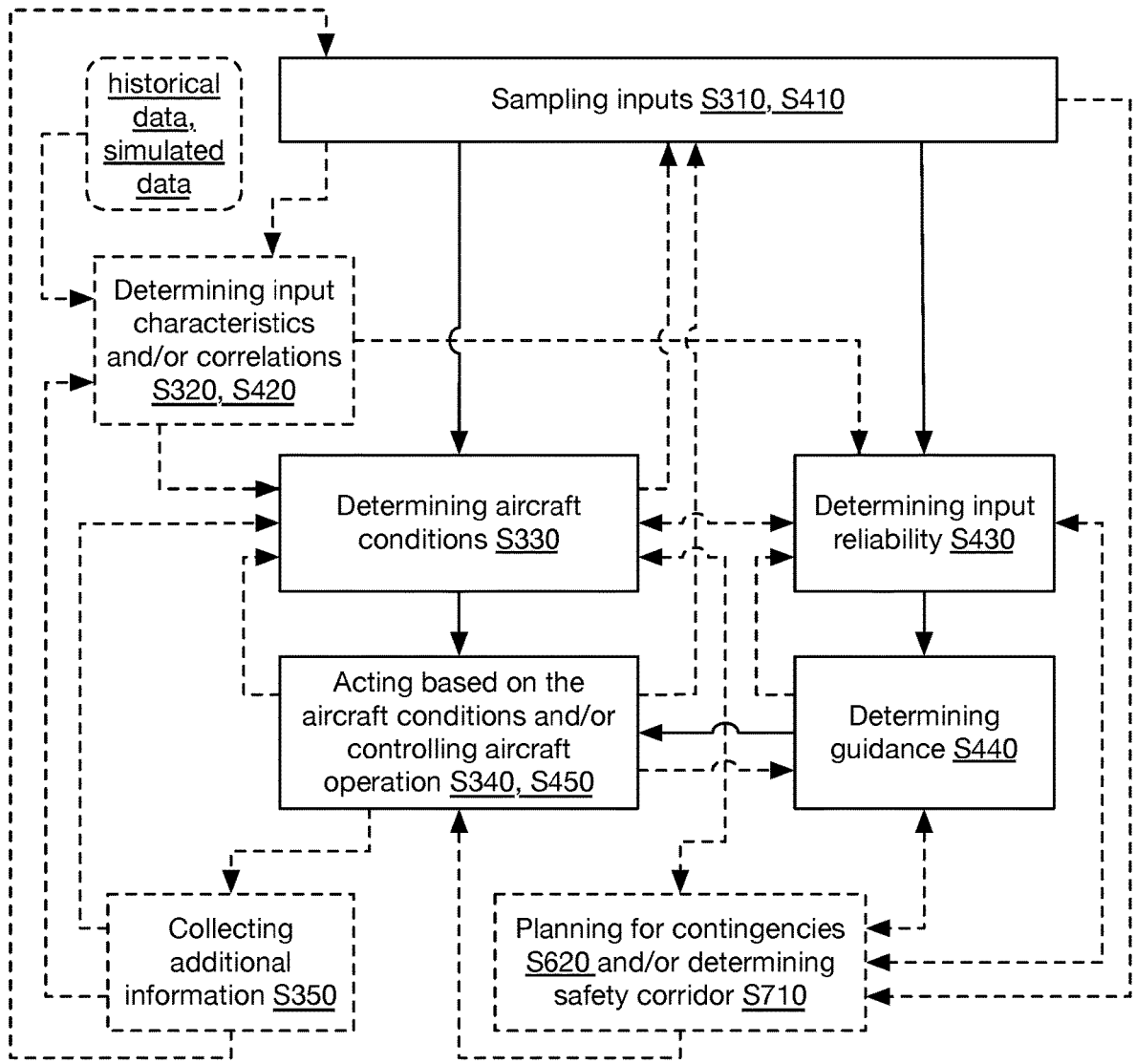
FIG. 11 is a flow chart representation of a fourth embodiment of the method.

The method is preferably performed throughout aircraft operation (e.g., continuously, periodically, sporadically, etc.; during aircraft flight, in preparation for and/or following flight, at all times, etc.). One or more (e.g., any or all) of the embodiments can be performed, preferably wherein embodiments for situational awareness, vehicle control, and contingency planning are all performed. The embodiments can be performed concurrently, consecutively, in alternation, interleaved, and/or with any other suitable timing relative to each other. The embodiments can optionally share elements (e.g., wherein sampling inputs is performed for both the embodiment 3 for situational awareness and the embodiment 4 for vehicle control, such as shown in FIG. 11), and/or the elements of the different embodiments can be combined in any suitable manner. However, any or all of the embodiments (and/or elements thereof) can additionally or alternatively include any other suitable elements, and/or can be performed with any other suitable timing.

2. Benefits

The vehicle system and/or method can confer several benefits. First, embodiments of the system and/or method can enable safe, reliable, consistent, fully-autonomous aircraft operation, such as by performing situational assessments of aircraft conditions and making decisions based on the conditions in order to optimize for low risk, high performance, and/or other mission goals. Second, embodiments of the system and/or method can supplement, replace, and/or improve upon the situational awareness of an experienced human operator (e.g., on-board pilot, remote operator, etc.), preferably including the 'fuzzy' evaluations (e.g., 'gut feelings') of such an operator. In examples, these embodiments can include: highlighting potentially-important information for the operator, prompting the operator for specific decisions and/or other information, cross-checking (and/or helping the operator to cross-check) various inputs, and/or any other suitable situational awareness enhancements. Third, embodiments of the system and/or method can enable training and/or assistance of less experienced human operators, such as by: segmenting responsibilities between the operator and autopilot modules (e.g., according to a training program that progressively assigns greater responsibility to the human operator), prompting the operator to act based on the aircraft conditions and/or instructing the operator on the correct or suggested action, assuming control when issues arise beyond the operator's skill (e.g., acting as a 'safety net' for the human operator), monitoring and/or assessing the operator's abilities, and/or performing any other suitable training aspects. Fourth, embodiments of the system and/or method can inform algorithms for defining a safety corridor through which the vehicle can traverse, based on statuses systems of the vehicle in relation to external factors (e.g., associated with weather, associated with terrain, associated with traffic, associated with noise, associated with disturbance of populations within range of the vehicle, etc.).

Second, embodiments of the system and/or method can potentially offer robust sensor redundancy and/or input-type redundancy, beyond just implementing voting-like decision techniques for identical and/or similar sensors and sensor types. The system and/or method can form a greater understanding of the system state and the state of its sensors (and other information input sources), and can compensate for the loss of some inputs by generating complementary information based on other inputs. This can be achieved by using many different kinds of sensors and other input sources (e.g., leveraging machine learning techniques to determine correlations between the sensors, and generating information such as predictions based on those correlations). For example, an embodiment of the system could lose almost any sensors from the set of radar, IMU, cameras, ultrasonic, GPS, and on-board diagnostics, and yet still fly safely using the remaining sensors, based on historical correlations between the sensors (e.g., using simultaneous localization and mapping).

Third, embodiments of the system and/or method can potentially offer robust guidance determination and/or autopilot redundancy. By independently making guidance and/or control decisions (e.g., using different inputs, different algorithms, independent processing hardware, etc.), embodiments of the system and/or method can be highly resistant to failure arising from unexpected (e.g., emergent) behavior.

Fourth, embodiments of the system and/or method can potentially be resistant to pilot errors. By evaluating pilot control inputs (e.g., along with other inputs such as sensor inputs), the system and/or method can detect signs of pilot failure and/or determine potential consequences of pilot commands, and can override the pilot if desired (e.g., to avert or recover from potentially-dangerous flight conditions, to optimize vehicle and/or mission performance, etc.).

Fifth, embodiments of the system and/or method can potentially increase safety (e.g., for the vehicle, vehicle occupants, vehicle cargo, other vehicles, other people and/or property, etc.) while enabling autonomous (e.g., fully autonomous, partially autonomous) performance of vehicle missions. The system and/or method can include planning ahead for many potential contingencies (e.g., undesired flight conditions such as emergency conditions, inefficient conditions, off-nominal conditions, etc.), optionally altering normal vehicle operation in order to improve the expected outcomes in case of such contingencies. For example, this can include enabling rapid, effective response to and/or resolution of undesired vehicle conditions.

However, the system and/or methods can additionally or alternatively confer any other suitable benefits.

3. System

The method is preferably performed using an aerial vehicle system (e.g., the systems described in U.S. application Ser. No. 15/643,205, titled "Vehicle System and Method for Providing Services", which is herein incorporated in its entirety by this reference; the system described below; etc.). The aerial vehicle system (e.g., aircraft) is preferably a rotorcraft (e.g., helicopter), but can additionally or alternatively be a fixed-wing aircraft and/or any other suitable aircraft.

The aircraft preferably includes one or more propulsion mechanisms (e.g., rotors, propellers, fans, jet engines such as airbreathing and/or rocket engines, etc.), power plants (e.g., motors) configured to drive the propulsion mechanisms (e.g., internal combustion engines, electric motors, etc.), and/or flight control surfaces (e.g., rotor blades, elevators, ailerons, rudders, flaps, etc.).

The aircraft preferably includes one or more sensors. The sensors can include one or more: radar sensors, lidar sensors, sonar sensors, cameras (e.g., CCD, CMOS, multispectral, visual range, hyperspectral, stereoscopic, etc.), spatial sensors (e.g., inertial measurement sensors, accelerometer, gyroscope, altimeter, magnetometer, etc.), location sensors (e.g., GPS, GNSS, triangulation, trilateration, etc.), force sensors (e.g., strain gauge meter, load cell), on-board diagnostic sensors such as aircraft mechanism sensors (e.g., sensing status of mechanisms such as rotors, control surfaces, engines, inputs, linkages, actuators, etc.; configured to sense position, force, speed, temperature, pressure, fluid quantity, etc.) and/or aircraft environment sensors (e.g., configured to sense cabin temperature, air pressure, oxygen concentration, indications of fire such as smoke and/or particulates, etc.), audio sensors (e.g., transducer, microphone, etc.), barometers, light sensors, temperature sensors, current sensors (e.g., Hall effect sensor), air flow meters, voltmeters, touch sensors (e.g., resistive, capacitive, etc.), proximity sensors, vibration sensors, chemical sensors, ultrasound sensors (e.g., ultrasound transducers and/or receivers), electrical sensors (e.g., impedance and/or continuity sensors), sensors configured to detect mechanical wear (e.g., fatigue, fractures such as sub-surface fractures, etc.), and/or any other suitable sensors. The sensors can optionally be classified based on priority (e.g., primary sensors, secondary sensors, tertiary sensors, etc.). In one example, the radar sensors of the aircraft are classified as primary sensors, and all other sensors of the aircraft are classified as secondary sensors. However, the aircraft can additionally or alternatively include any other suitable sensors, and/or can classify the sensors in any other suitable manner (and/or not classify the sensors).

For instance, in relation to arrays of motors and/or propulsion systems (e.g., as in a vertical-takeoff-and-landing system), the system can implement sensors for monitoring power efficiency characteristics (e.g., in relation to rotational speed, blade pitch, and/or power delivered; possibly including a ratio between rotor speed and power delivered to the rotor) of each motor involved in a given maneuver. Outputs of such sensors can then be used to determine if the system is behaving in an expected manner for the maneuver, in relation to known aircraft conditions (e.g., the current maneuver), environmental conditions, and/or any other suitable conditions.

In one example, the aircraft includes sensors, such as lidar and/or cameras, that are configured to sense information indicative of the status of external aircraft elements, such as moving and/or moveable components (e.g., control surfaces, landing gear, etc.). For example, the sensors can be configured to detect component position (and/or position of control elements configured to control and/or maintain component positions), component irregularities (e.g., damage, actuation problems, etc.), and/or other aspects of components such as the control surfaces. However, the aircraft can additionally or alternatively include any other suitable sensors.

The aircraft preferably includes one or more communication modules (e.g., wireless communication modules, such as radios). The radios can be configured to receive and/or transmit ADS-B information, air traffic control (ATC) information, ground station network information, and/or any other suitable information. The radios are preferably configured to communicate (e.g., via direct radio transmission, via one or more relays and/or other intermediaries, such as satellites, etc.) with the ground station network, ATC centers, other aircraft, and/or any other suitable endpoints (e.g., using voice and/or data communication).

The aircraft can optionally include human control inputs (e.g., pilot controls, operator controls, layman controls, etc.). The inputs can be on-board and/or remote (e.g., received through a communication module). The inputs can include traditional manual inputs (e.g., yoke and/or stick such as cyclic stick, pedals, throttle control, collective, etc.), auto-pilot inputs (e.g., desired destination, heading, altitude, attitude, speed, etc.), alternative inputs (e.g., simplified command inputs such as abort, avoid obstacle straight ahead, etc.), and/or any other suitable human control inputs.

The aircraft can include a plurality of processors, preferably independent physical processors, but additionally or alternatively virtual processors (e.g., implemented on one or more physical processors). Each processor of the plurality preferably has segregated responsibilities (e.g., separated and/or sandboxed from the other processors). For example, the aircraft can include separate processors to perform one or more of: receiving and/or analyzing inputs (e.g., from input sources such as sensors, communication modules, human control inputs, etc.), determining guidance (e.g., flight control guidance) based on inputs from one or more of the input sources, determining desired flight control behavior based on the determined guidance(s) (e.g., multiplex the guidances determined based on different inputs), and/or controlling aircraft operation (e.g., based on the desired flight control behavior); and/or separate processors to implement one or more modules of the aircraft control architecture (e.g., as described below), such as an independent processor for each of: the mission planner, the contingency manager, the state estimator, and the mission executor. The processors can be: CPUs (e.g., with one or more cores), GPUs, TPUs, microprocessors, and/or any suitable processors. Additionally or alternatively, the aircraft can include a single processor, no processors, or any other suitable number of processors of any suitable type(s). The aircraft can optionally include memory (e.g., Flash, RAM) that stores data (e.g., compute modules, such as planners and managers, etc.; sensor data; flight data; time-series confidence data, state data, sensor data, etc.; mission data; etc.) accessible by the processor, which can be on-board or remote from the aircraft. In one variation, each section and/or component of the control architecture can have an independent processing system, including one or more processors and memory. Alternatively, different control architecture components can share processors (e.g., wherein the processor can be entirely shared or segmented by core or thread), memory, or other hardware components.

The aircraft can optionally include one or more recording modules (e.g., flight recorders, such as flight data recorders and/or cockpit voice recorders). The recording modules preferably function to log and/or store aircraft flight data. Aircraft flight data can include the inputs (e.g., sampled as described below regarding S310 and/or S410), guidance (e.g., determined as described below regarding S440), computational inputs, outputs, and/or intermediary states (e.g., generated as described below regarding the method), and/or any other suitable information. The recording modules are preferably capable of withstanding the conditions encountered in a severe aircraft accident (e.g., as specified by EUROCAE ED-112). However, the recording modules can additionally or alternatively perform any other suitable function.

The aircraft can optionally include one or more safety systems (e.g., as described in U.S. application Ser. No. 15/903,996, titled "Safety System for Aerial Vehicles and Method of Operation", and/or U.S. application Ser. No. 15/904,082, titled "Safety System for Aerial Vehicles and Method of Operation", each of which is hereby incorporated in its entirety by this reference). For example, the aircraft can include secondary (e.g., redundant, emergency, temporary, etc.) propulsion mechanisms (e.g., retro-rockets, secondary powerplants and/or rotors, etc.), ballistic parachutes, and/or any other suitable safety systems. The safety systems can function to provide one or more safety mechanisms (e.g., "last-resort" safety mechanisms) for the aircraft, aircraft contents, and/or aircraft surroundings. For example, one or more of the safety systems can be deployed (e.g., retro-rockets fired, parachute unfurled and/or otherwise deployed, etc.) in order to reduce the dangers associated with an imminent aircraft collision (e.g., collision with the ground, such as following a loss of propulsion and/or flight control), such as dangers of morbidity, mortality, and/or equipment damage. In one variant, the aircraft can include an electric motor configured to drive one or more aircraft rotors (e.g., main rotor, backup rotor, etc.), propellers, and/or other propulsion elements, and can include a battery configured to power the electric motor (e.g., electrically coupled to the motor), which can enable short-term rotor operation even if the primary aircraft powerplant (e.g., fuel-powered engine) fails (e.g., during flight).

The safety systems can additionally or alternatively include one or more impact attenuators (e.g., crumple zones). For example, a protected compartment (e.g., passenger cabin) of the aircraft can be highly rigid, and other structures of the aircraft can be more compliant and/or frangible (e.g., increasing compliance and/or frangibility farther from the protected compartment), such that the compliant and/or frangible structures can absorb energy during an aircraft collision. The safety systems can additionally or alternatively include one or more rotor seizing mechanisms, which can be operable to slow rotor rotation (e.g., rapidly slow and/or stop). In one example, the rotor seizing mechanisms can consistently, quickly, and repeatably slow the rotors (e.g., to a stop) upon aircraft landing. In a second example, the rotor seizing mechanisms can additionally or alternatively perform a catastrophic rapid rotor shutdown if necessary or desired. In a specific example of catastrophic rapid rotor shutdown, in response to determining that an object (e.g., a human) may collide with the rapidly spinning rotor (e.g., is likely to collide, such as more than a threshold probability of collision; could possibly collide; is near; etc.), the rotor seizing mechanisms (e.g., including a crumpling brake fixture) can cause the rotors to retract and/or seize, thereby preventing the collision and/or reducing the ensuing collision damage. However, the aircraft can additionally or alternatively include any other suitable safety systems, and/or can omit such systems. Actuation of the safety mechanisms and/or other components discussed above is preferably controlled by the mission executor (e.g., based on instructions from the mission planner and/or contingency manager), but can alternatively be remotely controlled (e.g., based on commands received from a remote operator, ground control station, air traffic controller, etc.), passively actuated (e.g., by airflow, etc.), manually controlled (e.g., via the human control inputs), or otherwise controlled.

In some examples, the system contains one or more occupants (e.g., humans, preferably living humans) during performance of some or all elements of the method. In some specific examples (e.g., in which the system contains occupants), the system does not contain any pilots (e.g., licensed pilot, unlicensed pilot, system operator, etc.) and/or does not receive control inputs from any pilots. However, the system can additionally or alternatively contain any other suitable occupants, and/or can contain no such occupants.

Although elements of the method are described as performed using an aircraft, a person of skill in the art will understand that the method (and optionally, any or all such elements of the method) can additionally or alternatively be performed using any other suitable system. For instance, the method can additionally or alternatively be performed using terrestrial vehicles (e.g., cars, road-going ambulances, etc.), amphibious vehicles, aquatic vehicles, space vehicles, or a combination of vehicle types.

4. Situational Awareness

4.1 Sampling Inputs.

Sampling inputs S310 preferably functions to collect information that can inform aircraft operation (e.g., flight control). The inputs can be sampled from sensors (e.g., from on-board sensors, remote sensors, etc.), communication modules (e.g., transmissions received by the communication modules, such as ADS-B information, ATC information, contextual information such as weather, communications from other aircraft, NOTAMs, etc.), human control inputs (e.g., flight control inputs such as cyclic stick or yoke adjustments), historical aircraft information (e.g., age, workload, maintenance record, possible problems, etc.), information determined during aircraft inspections (e.g., during pre-flight and/or post-flight checks, such as the most recent pre-flight check), and/or any other suitable inputs. For example, S310 can include, at each of a plurality of inputs (e.g., sensors of the aircraft, other inputs, etc.), sampling (e.g., substantially concurrently) respective sets of data (e.g., flight data).

Sampling inputs S310 can additionally or alternatively include receiving information from vehicle occupants (e.g., crew, passengers, etc.). The information can be determined (e.g., by the occupant) based on occupant sensory observations (e.g., touch, smell, vision, hearing, etc.), perceptions, and/or any other suitable information. S310 can optionally include requesting the information from the occupant (e.g., asking if the occupant detects an abnormal odor; asking the occupant to check if a particular wire is frayed, a particular fuse is blown, a particular bolt is loose, a particular structural member shows signs of fatigue, a particular structural member shows signs of corrosion, etc.; asking the occupant if any of the passengers are behaving unusually; asking the occupant is they detect an abnormal sounds, etc.), wherein the information can be received in response to the request. For example, if other inputs (e.g., inputs automatically sampled from aircraft sensors) indicate a potential issue (e.g., determined in S330), the method can include requesting information associated with the potential issue from the occupants. However, the information can additionally or alternatively be received from the occupant(s) at any suitable time and/or in response to any suitable trigger (or no trigger at all).

The inputs are preferably sampled continuously, but can additionally or alternatively be sampled periodically, sporadically, and/or with any other suitable timing. The inputs can be sampled during aircraft flight, before flight (e.g., for a pre-flight safety check), after flight (e.g., for a post-flight damage assessment), and/or at any other suitable time.

The inputs are preferably sampled and/or processed by multiple independent processors (e.g., each processor dedicated to a single sensor, sensor type, sensor class, and/or other sensor subset), but can alternatively be sampled by a single processor, or the sampling responsibilities can be otherwise distributed. The processors are preferably all on-board the aircraft, but alternatively some or all processors can be remote to the aircraft (e.g., wherein processor outputs are received by an aircraft communication module).

4.2 Determining Input Correlations.

Determining input correlations S320 preferably functions to enable determination of aircraft conditions (e.g., detection of typical, unusual, and/or potentially dangerous aircraft conditions) based on the correlations. The correlations preferably include sensor-aircraft condition correlations (e.g., correlations between one or more sensor readings and the associated aircraft conditions) and/or input self-correlations (e.g., expected temporal trends), but can additionally or alternatively include any other suitable correlations.

The aircraft conditions can include desired (e.g., ideal, efficient, safe, acceptable, typical, etc.) and/or undesired (e.g., inefficient, uncomfortable, dangerous, atypical, etc.) conditions, and preferably include classifications (and/or other characterizations) of specific conditions (e.g., classification as desired or undesired; more specific classification, such as the sub-classes described above; severity classifications and/or other ratings; etc.). The aircraft conditions can include conditions related to aviation, navigation, risk mitigation, aircraft equipment, occupants (e.g., passengers, personnel, other living occupants), remote operators, regulation compliance, efficiency, mission objectives (e.g., satisfaction thereof), and/or any other suitable conditions. For example, aircraft conditions can include information regarding control surfaces, powertrains (e.g., engines, transmissions, rotors, etc.), fuel systems, landing systems, avionics, structural integrity, forces, stresses, and/or strains, collision threats (e.g., terrain, traffic, other obstacles, etc.), environmental conditions (e.g., weather), and/or any other suitable information regarding the aircraft and/or aircraft flight.

The correlations can be determined based on sampled inputs (e.g., sampled during S310, previously sampled, etc.), simulated data (e.g., finite element modeling results, such as for expected mechanical strain under specified flight conditions), historical data (e.g., from the same aircraft, same and/or similar aircraft types, and/or any suitable aircraft or other data sources), aircraft component properties (e.g., resonant frequencies), and/or any other suitable information.

The correlations can be determined concurrent with and/or following (e.g., immediately, after a delay time, etc.) sampling the inputs S310, prior to sampling the inputs S310 (e.g., determined based on historical data concurrent with and/or following sampling of the historical data), and/or with any other suitable timing.

The correlations can be represented (e.g., for storage, transmission, processing, etc.) as functions (e.g., correlating two or more input values over a functional form such as a surface), neural networks such as convolutional neural networks (e.g., wherein S320 includes training the neural networks), Bayesian networks, Markov chains and/or control policies, probability distributions, heuristics, and/or can have any other suitable representation. The correlations can be determined using machine learning and/or statistical techniques (e.g., regression, classification, clustering, etc.), determined based on human inputs (e.g., human-defined heuristics, threshold values, and/or correlations, etc.), and/or determined in any other suitable manner. For instance, training of machine learning algorithms can be based upon training datasets generated with involvement from entities experienced in flight and/or operations of the vehicle(s) associated with the method, thereby leveraging experience of those for whom situational awareness during vehicle operations has become innate. Machine learning and/or statistical techniques can, however, be implemented in any other suitable manner.

The correlations can be determined on-board (e.g., by an on-board processor, such as a processor used to sample inputs S310, a different processor, etc.), remotely (e.g., by a remote processor), and/or by any other suitable components. Determining the correlations S320 can additionally or alternatively include receiving the correlations (e.g., at the aircraft, from a remote server such as at a ground station). The received correlations are preferably determined by the transmitter (e.g., the ground station), but can additionally or alternatively be determined by any other suitable entities (e.g., computing systems, human operators, etc.). The received correlations can be determined (e.g., as described above and/or otherwise) substantially concurrent with transmission (e.g., immediately before transmission), prior to transmission (e.g., based on historical data), and/or with any other suitable timing.

In one variant, inputs including audio (e.g., frequency components of audio data, such as data indicative of resonant frequencies of aircraft elements and/or otherwise characteristic frequencies), strain, acceleration, rotation rate, and/or heading are correlated with conditions such as aircraft component movement (e.g., rotor operation, engine operation, control surface position and/or movement, structural member vibration, fastener movement, etc.), mechanical forces within the aircraft (e.g., exerted on structural and/or functional members of the aircraft), and/or aircraft motion. The inputs can be sampled by sensors (e.g.; microphones, preferably multiple microphones arranged throughout the aircraft, thereby providing spatially-resolved audio information (e.g., determined based on relative intensity, trilateration, triangulation, multilateration, etc.); strain gauges; IMUs; etc.), such as sensors of the aircraft, other aircraft, and/or test rigs, can be simulated (e.g., using computerized modeling techniques such as finite element modeling), and/or determined in any other suitable manner. In one example, audio data (e.g., spatially-resolved audio data, frequency components of audio data, etc.) is correlated with power plant and/or flight control surface operation (e.g., in relation to engine operation, etc.). However, S320 can additionally or alternatively include determining any other suitable correlations.

4.3 Determining Aircraft Conditions.

Determining aircraft conditions S330 preferably functions to determine (e.g., detect, predict, etc.) potential issues, such as aircraft conditions that may be undesired and/or problematic, and can additionally or alternatively function to detect typical, acceptable and/or desired aircraft conditions. Aircraft conditions can be determined based on the inputs (e.g., sampled in S310), the input correlations (e.g., determined in S320), and/or previous aircraft conditions determinations (e.g., potential issues determined in previous performances of S330, other aircraft conditions determined based on input correlations and/or in any other suitable manner, etc.). The aircraft conditions are preferably determined in response to determining (and/or receiving) the inputs and/or input correlations (e.g., concurrent with sampling the inputs).

For example, based on (e.g., preferably in response to sampling) a dataset (e.g., sampled in S310, such as at one or more sensors of the aircraft) indicative of an undesired condition (e.g., associated with one or more flight control elements of the aircraft, such as a flight control surface, propulsion mechanism, etc.), S330 can include determining existence of the undesired condition (e.g., determining that the flight control element(s) are in the undesired condition). The dataset can be indicative of an undesired condition when: the dataset value set (and/or elements thereof) substantially matches a predetermined pattern associated with an undesired condition (and/or does not substantially match any predetermined patterns associated with desired conditions, which can be indicative of an unknown condition), one or more values of the dataset fall below (or exceed) a predetermined threshold, a score calculated from the dataset value(s) satisfies a condition associated with the undesired condition, and/or is otherwise determined to be indicative of the undesired condition. In some examples, S330 can additionally or alternatively include determining that one or more additional datasets (e.g., associated with other inputs, such as other types of sensors) are indicative of and/or consistent with (e.g., not substantially conflicting with a determination of the existence of) the undesired condition.

The aircraft conditions can be determined continuously, periodically, sporadically, in response to occurrence of a trigger (e.g., extreme value, other aircraft conditions determination, receiving a human input trigger, etc.), and/or with any other suitable timing. Aircraft conditions are preferably determined during aircraft flight, but can additionally or alternatively be determined before flight (e.g., during a pre-flight check), after flight (e.g., during a post-flight inspection), and/or at any other suitable time.

Aircraft conditions are preferably determined on-board the aircraft (e.g., by one or more on-board processors, such as the processors that perform S320 and/or different processors), but can additionally or alternatively be determined remotely (e.g., by a remote processing system, such as based on inputs transmitted from the aircraft to the remote processing system, wherein the determinations are subsequently transmitted to the aircraft).

Aircraft conditions can be determined using machine learning and/or statistical techniques (e.g., as described above regarding S320, such as using a neural network trained in S320), heuristic techniques, based on human inputs (e.g., operator assessments of aircraft conditions), and/or in any other suitable manner. S330 can optionally include determining (e.g., associated with a specific aircraft condition determined in S330, associated with the overall status of the aircraft, etc.) one or more: classifications (e.g., typical, atypical, desired, undesired, known, unfamiliar, etc.; classifications such as described above regarding S320), confidence values (e.g., likelihood that the classification is correct), qualitative and/or quantitative assessments (e.g., of a characteristic of the determined aircraft condition(s), such as inefficiency, risk, etc.; determined by a regression and/or classification technique, aircraft dynamics calculation, fuel consumption calculation, risk assessment calculation, etc.), and/or any other suitable aircraft status characterizations. For example, S330 can include determining the severity associated with the aircraft conditions, such as by scoring or ranking the potential issues associated with the conditions (e.g., categorizing the issues and ranking them based on predetermined category rankings, scoring based on predicted negative and/or positive impacts, etc.). In a specific example, imminent terrain collisions may be categorized as very high severity, power plant failures and passenger heart attacks may be categorized as high severity, electrical system failures and imminent bird strikes may be categorized as moderate severity, minor fuel inefficiencies may be categorized as low severity, and passenger anxiety may be categorized as very low severity. However, the aircraft condition severity can additionally or alternatively be determined in any other suitable manner (or not be determined).

Unfamiliar conditions (e.g., the presence of unfamiliar inputs and/or combinations of inputs) likely represent atypical (e.g., and therefore undesired) aircraft status (e.g., indicative of a potential issue), but the particular conditions associated with the aircraft status are unknown (e.g., and therefore the potential consequences and/or appropriate corrective actions are also unknown). Such unfamiliar conditions may merit or require sampling additional inputs (e.g., such as described above regarding S310; which may enable more accurate and/or specific determination of the aircraft condition) and/or performing corrective actions (e.g., such as described below regarding S340), although in some cases the appropriate actions to take in response to determining the unfamiliar conditions may not be known. S330 can optionally include determining (or attempting to determine) the severity (e.g., likely severity, worst-case severity, probabilistic severity distribution, etc.) of the potential issue(s) associated with the unfamiliar conditions (e.g., taking conservative corrective actions, such as safety system deployment and/or emergency landing, in response to high-risk conditions; taking minimal or no corrective action in response to low-risk conditions). However, unfamiliar conditions can additionally or alternatively be handled in any other suitable manner.

Determining aircraft conditions S330 preferably includes determining one or more specific issues (e.g., possible, probable, and/or imminent events such as collisions, low fuel conditions, equipment failures, and/or passenger medical condition deterioration; optimization considerations such as route, speed, and/or efficiency; etc.) associated with the aircraft conditions (e.g., for atypical, undesired, and/or problematic conditions). However, S330 can additionally or alternatively include determining a type or classification of the issues, such as aviation, navigation, communication, human-related, aircraft equipment such as electrical and/or mechanical (e.g., control surface actuation, structural failure, etc.); spatial regions associated with the issues (e.g., upper left portion of the aircraft frame); severity of the issue (e.g., as described above); inputs associated with (e.g., indicative of) the issue; and/or any other suitable information associated with the issues, or can include determining no information associated with the issues.

Aviation issues can include: stalled condition or imminent stall risk (e.g., pitching up, aileron stall, rolling into a tip stall, etc.), spin risk, imminent collision (e.g., determined based on a collision avoidance system such as TCAS; collision with traffic, terrain, etc.), uncoordinated flight (or, lack of desired forward- and/or side-slip, such as when appropriate during landing), rotor efficiency (e.g., for each of a set of rotors of the aircraft, based on the current maneuver, weather conditions, etc.), and/or any other suitable aviation issues.

Navigation issues can include: failure to track a desired course (e.g., incorrect position, heading, attitude, airspeed, ground speed, altitude, vertical speed, etc.), inadvisability of a planned and/or current course (e.g., due to weather, terrain, traffic, restricted and/or closed airspace, bird flocks, etc.), problematic (e.g., conflicting, dangerous, etc.) instructions (e.g., simultaneous takeoff and/or landing clearances on crossed runways, instructions to fly toward terrain, hold and/or divert instructions given to aircraft with insufficient fuel to safely comply, etc.), such as problematic instructions received from ATC, ground stations, other aircraft, and/or any other suitable entities, and/or any other suitable navigation issues. In one example, a course tracking issue can be determined based on a discrepancy between aircraft heading data (e.g., determined based on magnetometer readings, controlled by an autopilot system, etc.) and location data (e.g., determined using GPS, determined based on nearby transponders and/or other landmarks, etc.).

Communication issues can include: failure (of the aircraft and/or other aircraft, such as nearby aircraft) to respond to radio calls, request clearances, and/or comply with ATC instructions; blocked frequencies and/or bands (e.g., indicative of jamming); unreachable counterparties; and/or any other suitable communication issues.

Human-related issues (e.g., occupant state data) can include pilot or controller condition (e.g., panic, injury, hypoxia, incapacitation, etc.), passenger condition (e.g., medical condition; behavior; comfort; enjoyment, such as for a sightseeing flight; etc.), and/or any other suitable human-related issues.

Aircraft equipment issues can include: structural issues (e.g., loose or missing fasteners, undesired structural deflection or deformation, undesired vibrations, fatigued structural members, etc.); engine and/or propulsion issues (e.g., indicated by sounds; temperatures such as oil temperatures, cylinder temperatures, exhaust temperatures, body temperatures, etc.; oil pressures; fuel system data such as fuel flow and/or remaining fuel quantity; etc.); control issues (e.g., associated with flight control surface response, propulsion system response, landing gear actuation, etc.); electrical issues (e.g., battery issues, such as issues indicated by battery temperature, current, and/or voltage; unpowered and/or inadequately powered components; circuit interruptions, such as due to fuses or circuit breakers in a 'tripped' or off state, due to severed or otherwise failed wiring, etc.; issues indicated by characteristic odors; etc.); fires; environmental control issues (e.g., cabin temperature, environmental air pressure and/or oxygen content, etc.); communication equipment issues such as radio failure or other malfunction; and/or any other suitable aircraft equipment issues.

However, the issues determined in S330 can additionally or alternatively include any other suitable issues, and/or S330 can additionally or alternatively include determining aircraft conditions in any other suitable manner.

4.4 Acting Based on Aircraft Conditions.

Acting based on the aircraft conditions S340 preferably functions to take corrective action in response to potential issues and/or to maintain desired aircraft operation. S340 is preferably performed in response to performing S330 (e.g., performed immediately in response to determining that the current aircraft conditions are undesired, such as in near-real time), but can additionally or alternatively be performed at any other suitable time. S340 can optionally include controlling aircraft operation and/or reacting to undesired flight conditions (e.g., as described below, such as regarding S450 and/or S640) and/or acting in any other suitable manner.

S340 preferably includes determining actions to take based on the severity of the potential issues. For example, S340 can include determining actions to take (e.g., selecting from a set of potential actions, types of actions, and/or desired outcomes) based on severity assessments (e.g., scores, rankings, etc.; determined in S330 or otherwise determined), such as ensuring that the aircraft avoids high-risk situations such as terrain or traffic collisions, rather than prioritizing fuel savings or bird collision avoidance.

In a first embodiment, S340 includes controlling the aircraft (e.g., altering aircraft operation) based on the aircraft conditions. The aircraft can be controlled as described in U.S. application Ser. No. 15/643,205, titled "Vehicle System and Method for Providing Services", which is herein incorporated in its entirety by this reference. For example, S340 can include updating an aircraft mission plan (e.g., at the aircraft flight management system), revising a planned series of maneuvers (e.g., at the guidance layer), and/or altering aircraft control signals (e.g., at the control system). However, the aircraft can additionally or alternatively be controlled in any other suitable manner.

In this embodiment, S340 can include directly controlling aircraft components and/or providing higher-level aircraft control guidance, and can additionally or alternatively include controlling the aircraft in any other suitable manner. Directly controlling aircraft components can include, for example, altering (e.g., correcting) flight controls such as control surface positions and/or propulsion system settings (e.g., increase or decrease throttle), switching operation between aircraft components (e.g., switching from a primary component to a backup component), activating safety systems (e.g., retro-rocket and/or ballistic parachute, such as described herein, such as regarding the system and/or contingency planning), and/or controlling any other suitable components in any suitable manner. Providing higher-level guidance can include, for example, altering the planned aircraft route (e.g., providing new tracks and/or waypoints to an aircraft autopilot system), commanding the aircraft to land (e.g., perform an emergency landing; reroute to a dedicated landing site, such as the closest site or the site that can be reached at the lowest risk; etc.), updating the aircraft decision-making algorithms, and/or providing any other suitable guidance. In some examples, S340 includes reacting to undesired flight conditions (e.g., as described below regarding S540), such as by implementing a contingency plan (e.g., controlling the aircraft based on predetermined guidance and/or control instructions) in response to determining aircraft conditions (e.g., detecting undesired flight conditions, such as described below regarding S630), preferably immediately in response to determining the aircraft conditions (e.g., in near-real time), but alternatively after a predetermined delay (e.g., associated with the contingency plan) and/or at any suitable time. S340 can additionally or alternatively include determining and/or implementing (e.g., controlling the aircraft based on) one or more modified flight plans (e.g., different than a flight plan in use prior to determining the aircraft conditions S330), such as selecting, flying to, and/or landing at a new aircraft destination, and/or aborting or changing a mission associated with the aircraft. S340 can additionally or alternatively include controlling the aircraft in an alternate state (e.g., as described below, such as regarding the embodiment 4 of the method), such as changing aircraft operation from a normal flight mode to a conservative mode (e.g., wherein operation limits, such as speed, force, stress, safety margin, etc. are more conservative than in the normal flight mode). For example, aircraft operation in the normal flight mode can include flying substantially at a first speed, whereas operation in the conservative mode can include maintaining speed at or below a second speed less than the first speed (e.g., less by a factor such as 5%, 10%, 15%, 20%, 25%, 35%, etc.).

This embodiment can optionally include communicating the presence of the issue and/or the corrective actions taken in response to the issue (and/or any other suitable information). This information can be communicated to a remote control entity (e.g., ground station network); an onboard or remote pilot, operator, and/or passenger; a control authority such as ATC; other aircraft (e.g., nearby aircraft); and/or any other suitable entities.

In a second embodiment, S340 includes presenting information associated with the aircraft conditions to one or more humans (e.g., pilot, passenger, remote operator, etc.). For example, S340 can include generating an alert output (e.g., auditory output such as a klaxon, 'ding', and/or spoken alert; visual output such as a flashing alarm, indicator light, and/or display screen message; tactile output such as a stick shaker; etc.) in response to determining the existence of a potential issue, which may prompt the operator to take corrective action. The alert output can be indicative of the aircraft conditions (e.g., "altitude below flight plan" or "altitude is 3200 feet") and/or the suggested corrective actions (e.g., "pull up" or "climb and maintain 5000 feet"), but can additionally or alternatively be indicative of any other suitable information. One variation of this embodiment includes, in response to detecting an undesired aircraft condition: determining a set of corrective actions (e.g., to correct the undesired condition); presenting an alert to an operator, informing the operator of the undesired condition and/or the corrective actions; receiving confirmation (e.g., approval of the corrective actions, absence of denial of the corrective actions for a threshold period of time, etc.) from the operator; and, in response to receiving the confirmation, controlling the aircraft according to the corrective actions.

S340 can optionally include determining and/or adjusting the actions taken based on information associated with the human pilot or operator. Such information can include: pilot skill level (e.g., input by the operator or another human, determined based on historical flight data and/or control performance, etc.), correlations with other pilots (e.g., in similar flight conditions, on similar missions, operating the same or similar aircraft, etc.), preferences and/or policies (e.g., pilot alert settings, company policy, etc.), training programs (e.g., a trainee pilot is expected to be able to correct for, or is learning how to correct for, a first set of issues but not a second set of issues), and/or any other suitable pilot information. Adjustments to the actions taken can include: changing between controlling the aircraft and presenting information (e.g., switching from the first embodiment described above to the second), altering one or more thresholds for performing the actions (e.g., threshold severity, threshold duration of undesired conditions, etc.), altering one or more intensities associated with the actions (e.g., changing to a different type of alert output, such as from a visual indicator to a klaxon, and/or introducing additional alert outputs; changing the intensity of an alert output, such as increasing the volume of an audible alert; altering the type and/or extremity of flight control adjustments; etc.), and/or any other suitable adjustments.

In one variation, in which a trainee pilot is operating the aircraft, S340 can include acting immediately (e.g., not altering the performance of S340 based on pilot information, reducing a threshold to act based on the information, etc.) in response to detecting higher-severity issues such as issues that pose a significant safety risk. In this variation, in response to detecting lower-severity issues (e.g., slightly uncoordinated flight during a turn), S340 can include: before taking any action, waiting for the trainee pilot to notice the issue and correct it without assistance, and only after a threshold time without pilot correction, generating a low-urgency alert output (e.g., visual indication, such as an "uncoordinated turn" message on a display) and then continuing to wait. After a second threshold time following presentation of the low-urgency alert output in which the pilot still does not correct the issue (e.g., does not attempt to correct the issue, fails to adequately correct the issue, etc.), S340 can include one or more of: increasing the alert output urgency (e.g., generating a more noticeable and/or higher-intensity alert), providing specific instructions (e.g., "apply right pedal"), and/or controlling the aircraft to correct the issue (e.g., activating an autopilot module to correct the issue). However, the actions taken in S340 can additionally or alternatively be determined based on any other suitable information.

During and/or after performing S340, the method preferably includes continuing to perform S310 and/or S330, and continuing to perform S340 (e.g., in response to new and/or updated determination of aircraft conditions, such as based on new inputs). For example, if S340 is performed in response to determination of a potential issue, the method can include determining whether the potential issue has been resolved, and continuing to take action (e.g., the same actions as before and/or different actions) or ceasing the actions based on the determination (e.g., if the issue has been resolved, ceasing the corrective actions and returning to normal operation, such as by returning to flying the aircraft in a normal flight mode); if the corrective actions are beginning to resolve the issue, continuing to perform them; if the corrective actions are ineffective, performing additional or alternative corrective actions).

S340 can additionally or alternatively include taking delayed actions (e.g., not immediately following S330), such as, after the completion of a flight during which aircraft conditions are determined, taking actions in response to the in-flight aircraft conditions. For example, S340 can include flagging aircraft conditions for actions such as investigation and/or repair, and then performing the actions at a time when they are possible, easier, or otherwise preferred (e.g., performing aircraft maintenance after landing, such as during a post-flight inspection, rather than during flight).

However, S340 can additionally or alternatively include performing any other suitable actions in any other suitable manner.

4.5 Collecting Additional Information.

Collecting additional information S350 can function to enable refinement of determinations made in S320 and/or S330 (e.g., related to current and/or future aircraft conditions). S350 can be particularly useful with regard to unfamiliar conditions, but can additionally or alternatively be employed with regard to any suitable aircraft conditions. For example, in response to determining that the aircraft conditions are unfamiliar, the method can include collecting additional information S350 to help determine the cause and/or effects of the unfamiliar conditions. However, S350 can additionally or alternatively include collecting additional information regarding any suitable aircraft conditions, such as receiving confirmation (and/or disconfirmation) of an aircraft conditions determination made in S330 (e.g., when the conditions are not unfamiliar). The additional information can include mechanical and/or structural information (e.g., a particular bolt is loose, a particular surface shows signs of mechanical fatigue, etc.), occupant-related information (e.g., passenger acting erratically, patient medical condition, etc.), sensory information (e.g., presence or absence of a characteristic odor), and/or any other suitable information.

S350 can be performed in response to determining aircraft conditions S330 (e.g., immediately in response, concurrent with S340, etc.), performed at times when the additional information can be safely and/or easily collected, and/or performed at any other suitable time. In a first variation, S350 is performed while the aircraft conditions indicate presence and/or risk of a potential issue (e.g., as described above regarding requesting information from aircraft occupants in S310), such as during flight in response to determining the conditions in S330. In a second variation, S350 is performed after resolution of the potential issue (e.g., immediately following its resolution, such as to avoid unnecessary crew distractions during a potentially dangerous period of time; after landing, such as during a post-flight inspection; etc.).

The method preferably includes performing (e.g., repeating) S320 based on the additional information collected in S350 (e.g., update the training of the neural network generated in S320). For example, the input correlations determined in S320 can be updated based on the determined cause of the inputs. The information determined in S350 can additionally or alternatively be used directly, such as in S330 and/or S340 (e.g., aircraft conditions determined based on the additional information, rather than or in addition to being determined based on the input correlations), and/or can be used in any other suitable manner.

4.6 Example.

Figure 3:
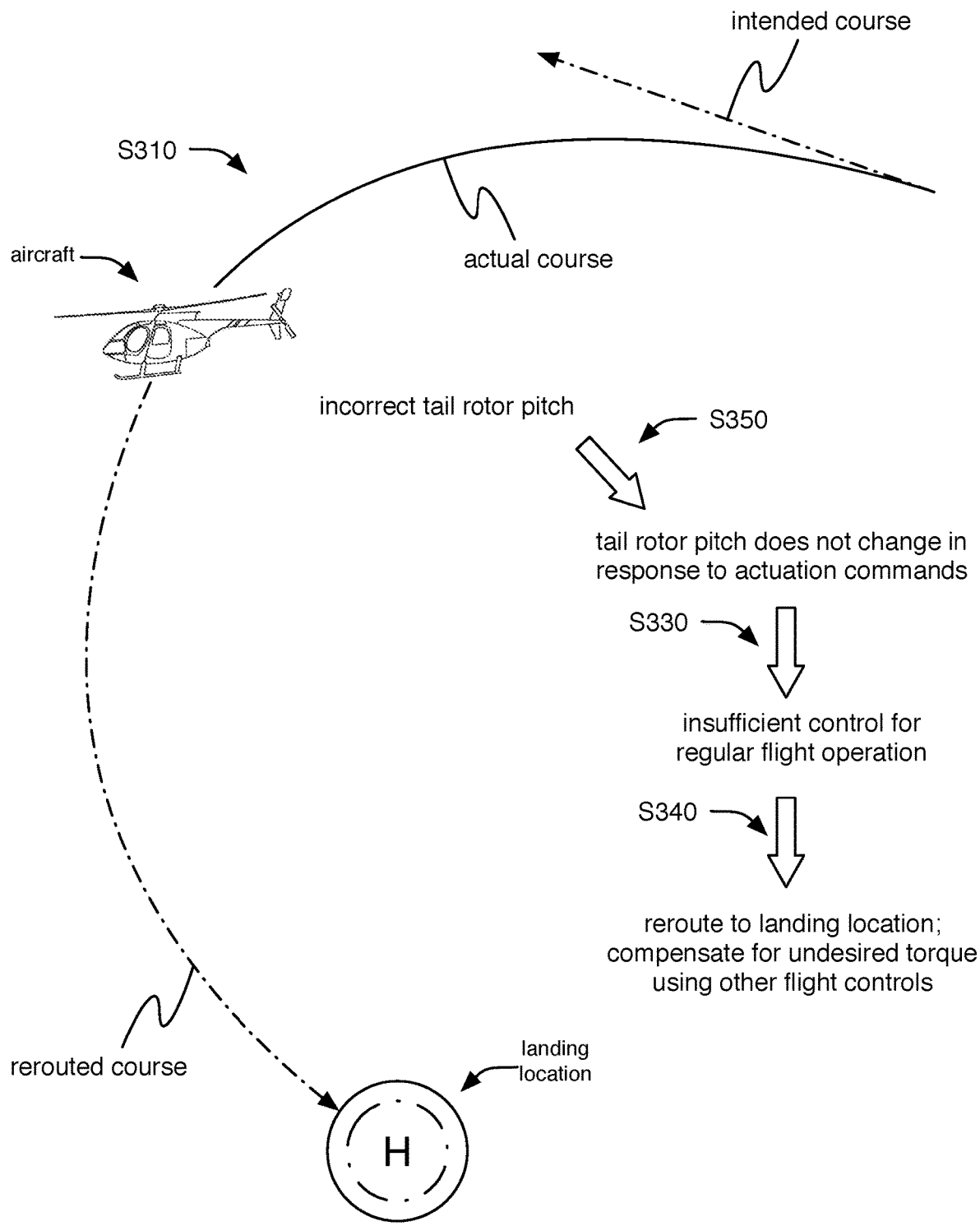
FIG. 3 is a schematic representation of a specific example of the method.

In one example (e.g., as shown in FIG. 3), aircraft attitude and/or course data sampled in S310 indicates that the aircraft is not following commanded instructions (e.g., control instructions received from a human pilot or an autopilot module), such as a set of flight data indicative of an undesired aircraft trajectory (e.g., aircraft not tracking along a commanded turn), and data from a control surface position sensor (e.g., external sensor, such as camera, time-of-flight sensor such as lidar or radar, etc.; internal sensor, such as control surface and/or actuator encoder, etc.) indicates that a control surface is not in the expected (e.g., commanded) position (e.g., due to rigging), such as being indicative of an actuation failure of the flight control surface. Based on the incorrect aircraft flight response and the improper control surface position, S330 includes determining the presence of an issue with the control surface. To collect additional information S350 related to the control surface issue, a different control surface position is commanded. The different control surface position can be farther along the current direction, toward a center or neutral position or an opposite extremum (e.g., followed by a return to the previous or originally-commanded position), or any other suitable position.

The result of the attempt to move the control surface (e.g., determined based on inputs such as attitude information, location information, external sensor measurements, etc.) is examined. In some cases (e.g., wherein the issue is resolved or partially resolved by the control surface movement), the issue may be determined to have been caused by a miscalibration between the control surface commands (e.g., control signals sent to control surface actuators) and the actual resulting control surface position. In these cases, the method preferably includes taking corrective actions such as adjusting the calibration (e.g., recalibrating during flight and/or after landing), and it may be possible to continue aircraft flight as usual (e.g., when the issue is sufficiently resolved, such that it does not significantly hamper flight safety and/or mission performance).

In other cases, there may be an inability to control (or fully control) the control surface (e.g., wherein control surface movement, such as movement in one or more directions and/or into one or more normal operating ranges, cannot be achieved or adequately and/or reliably controlled, possibly causing a directional bias during aircraft flight). In response to such an inability, the method preferably includes evaluating the aircraft conditions in light of the inability and determining appropriate corrective actions (e.g., based on the directional bias). The corrective actions can include: compensating for the altered control surface movement (e.g., adjusting use of the other control surfaces accordingly), restricting aircraft operation parameters (e.g., lower speed, wider turns, greater clearances from obstacles, etc.), rerouting (e.g., to reduce the magnitude and/or probability of operational challenges during flight), performing an expedited landing (e.g., at the nearest dedicated landing location or the dedicated landing location the aircraft can reach most easily or at the lowest risk) or an emergency landing (e.g., in a non-standard landing location, such as the nearest or most easily reached acceptable landing location), deploying one or more safety systems (e.g., retro-rockets, ballistic parachutes, etc.), and/or any other suitable corrective actions.

The issue is preferably noted and/or communicated to other entities (e.g., ground station network), and can prompt further investigation and/or repair (e.g., the issue is 'flagged' for further attention during post-flight inspection and/or maintenance).

However, the method can additionally or alternatively include any other suitable elements performed in any suitable manner.

5. Vehicle Control

5.1 Sampling Inputs.

Sampling inputs S410 preferably functions to collect information that can inform aircraft operation (e.g., flight control). The inputs can be sampled as described above regarding S310 and/or in any other suitable manner. The inputs can be sampled together for both the method 3 for situational awareness and the method 4 for vehicle control, sampled independently for each method, and/or sampled with any other suitable timing and/or number of samplings.

5.2 Determining Expected Input Characteristics.

Determining expected input characteristics S420 preferably functions to establish expectations for sampled inputs. The characteristics can include expected (and/or unexpected) correlations (e.g., sensor-sensor correlations, sensor-control input correlations, control input-control input correlations, sensor-transmitted information correlations, etc.), expected (and/or unexpected) temporal trends (e.g., smooth samples, maximum rates of change, noise thresholds, etc.), and/or expected (and/or unexpected) input values (e.g., typical/atypical, usual/unusual, and/or possible/impossible values; values indicative/non-indicative of input failure; etc.). For human control inputs, the characteristics can include input quality classifications (e.g., including human-like microadjustments vs. substantially static), input agreement (e.g., expected agreement and/or lack of conflict between human co-pilot and/or non-human co-pilot control inputs), expected results of commanded behavior (e.g., determining whether the control inputs correspond to safe actions, such as based on current conditions), emotional state classification (e.g., based on the inputs, based on supplementary inputs such as facial image emotion recognition, vocal emotion recognition, biosensor readings such as heart rate and/or blood pressure, etc.) such as calm or panicked, and/or any other suitable characteristics.

The characteristics can be determined based on sampled inputs (e.g., sampled during S410, previously sampled, etc.), simulated data (e.g., finite element modeling results, such as for expected mechanical strain under specified flight conditions), historical data (e.g., from the same aircraft, same and/or similar aircraft types, and/or any suitable aircraft or other data sources), and/or any other suitable information.

The characteristics can be determined concurrent with and/or following (e.g., immediately, after a delay time, etc.) sampling the inputs S410, prior to sampling the inputs S410 (e.g., determined based on historical data concurrent with and/or following sampling of the historical data), and/or with any other suitable timing.

The characteristics can be represented (e.g., for storage, transmission, processing, etc.) as heuristics (e.g., identical sensors sampled concurrently should yield similar measurements), functions (e.g., correlating two or more input values over a functional form such as a surface), probability distributions, Bayesian networks, Markov chains and/or control policies, convolutional neural networks, and/or can have any other suitable representation. The characteristics can be determined using machine learning and/or statistical techniques (e.g., regression, classification such as valid or invalid, etc.), determined based on human inputs (e.g., human-defined heuristics, threshold values, and/or correlations, etc.), and/or determined in any other suitable manner.

The characteristics can be determined on-board (e.g., by an on-board processor, such as a processor used to sample inputs S410, a different processor, etc.), remotely (e.g., by a remote processor), and/or by any other suitable components. Determining the characteristics S420 can additionally or alternatively include receiving the characteristics (e.g., at the aircraft, from a remote server such as at a ground station). The received characteristics can be determined (e.g., as described above and/or otherwise), preferably by the transmitter (e.g., the ground station), substantially concurrent with transmission (e.g., immediately before transmission), prior to transmission (e.g., based on historical data), and/or with any other suitable timing.

In a first example, strain gauge readings (e.g., representing conditions such as vibrations and/or static strains indicative of aircraft states such as velocity and/or acceleration) can be correlated with readings sampled from IMUs, GPS receivers, radar systems (e.g., on-board radar, remote radar such as ATC radar, etc.), microphones (e.g., indicative of vibrations, airflow with respect to the aircraft frame, etc.), and/or visual sensors such as cameras (preferably analyzed using automated image analysis, but additionally or alternatively analyzed by human operators). In a second example, radar system (e.g., on-board radar) readings (e.g., indicative of a nearby obstacle) can be correlated with camera inputs, ADS-B information, and/or information received from direct aircraft-aircraft communication (e.g., corroborating presence and position of the obstacle). In a third example, sensor readings can be correlated with pilot inputs, such as detection of the aircraft pitch approaching a critical angle of attack (e.g., approaching a stall condition) being correlated with a pilot input (e.g., yoke or stick forward adjustment) to reduce aircraft pitch. However, determining expected input characteristics S420 can additionally or alternatively include determining any other suitable characteristics.

5.3 Determining Input Reliability.

Determining input reliability S430 preferably functions to assess the quality of the sampled inputs. Input reliability can be determined based on the inputs (e.g., sampled in S410), the expected input characteristics (e.g., determined in S420), and/or previous input reliability determinations (e.g., determined in previous performances of S430). The input reliability is preferably determined in response to determining (and/or receiving) the inputs and/or expected input characteristics (e.g., concurrent with sampling the inputs).

The input reliability can be determined continuously, periodically, sporadically, in response to occurrence of a trigger (e.g., extreme value, other input determined to be unreliable, receiving a human input trigger, etc.), and/or with any other suitable timing. Each reliability determination can be applied for a single input (e.g., a single sensor reading), for a stream of inputs (e.g., sampled over time from a single sensor), and/or for multiple input streams. The reliability determination can be sustained (e.g., for an input stream) until the next reliability determination for that input stream is performed, for a fixed time interval, until reset (e.g., in response to a human operator reset input), and/or for any other suitable period of time.

Input reliability is preferably determined on-board the aircraft (e.g., by one or more on-board processors, such as the processors that perform S420 and/or different processors), but can additionally or alternatively be performed remotely (e.g., by a remote processing system, wherein the determinations are subsequently transmitted to the aircraft).

Input reliability can be determined using machine learning and/or statistical techniques (e.g., as described above regarding S420), heuristic techniques, based on human inputs (e.g., operator assessments of input reliability), and/or in any other suitable manner. Performing S430 can produce one or more: classifications (e.g., reliable/unreliable), confidence values (e.g., likelihood that the input is reliable, such as determined by a regression technique), rankings (e.g., reliability-ordered list of input sources), and/or any other suitable reliability information.

S430 can additionally or alternatively include determining adjusted values associated with one or more inputs. In a first example, less-reliable inputs are corrected based on more reliable inputs. In a second example, derived values are determined based on multiple inputs, preferably reliable inputs, such as by averaging the input values (e.g., average of only reliable inputs, weighted average based on confidence values, etc.). S430 can additionally or alternatively include determining derived values by performing analysis (e.g., based on the inputs such as reliable inputs, input correlations, etc.) such as simultaneous localization and mapping, wherein the results of the analysis can be used for aircraft operation (e.g., used in determining input reliability S430, determining guidance S440, etc.). For example, radar, camera, and IMU data can be used to determine aircraft location (e.g., if a GPS system is unreliable). However, S430 can additionally or alternatively produce any other suitable information, and/or include any other suitable elements.

In a first variant, in which input reliability is determined based on a voting process, the aircraft includes three identical sensors (e.g., rotor head rotational speed sensors), each of which samples an input stream (e.g., received at the same processor, at three independent processors, etc.). Two of the sensors produce similar input values (e.g., near 1000 RPM, such as within 1%, 2%, or 5%) and the third sensor produces a very different input value from the other two (e.g., zero or substantially zero). The two mutually-consistent sensors are determined to produce reliable inputs, and the third (inconsistent) sensor is determined to produce unreliable inputs (e.g., determined at the same processor that samples the inputs, at a different processor, etc.). The two reliable input values can be averaged (e.g., at the same processor that determines their reliability, the same processor that samples them, a different processor, etc.) to produce a derived value.

In a second variant, inputs (e.g., received at the same processor, at multiple independent processors, etc.) are sampled from a plurality of different sensors. A first sensor (e.g., rotor head rotational speed sensor) produces readings inconsistent with the other sensors (e.g., the first sensor indicates zero rotor head rotation, but other inputs are indicative of vibrations consistent with normal engine operation and rotor head rotation). Based on the inconsistent readings, the first sensor is determined to be unreliable. The inconsistency can be determined based on classification (e.g., inputs from IMUs and strain gauges are each classified as "engine on & rotor head spinning normally" inputs, and the first sensor input is classified as a "rotor head stopped" input), regression (e.g., first sensor input value is far outside the rotational speed predicted based on other inputs such as IMUs and/or strain gauges, from single-variable and/or multivariate regressions against the other inputs), and/or any other techniques. The unreliable input value from the first sensor can optionally be replaced by a derived value (e.g., predicted rotor head rotational speed, based on the regression against the IMU and strain gauge inputs).

In a third variant, a time series of readings from a sensor (e.g., input stream) indicates unreliability of the input stream (and/or a subset of the values, such as a specific time interval). The unreliability can be determined based on rapidly changing input values, frequent step changes (e.g., erratic readings), and/or any other suitable indications.

In a fourth variant, an input is determined to be unreliable because the input value is unlikely or impossible. For example, if a sensor normally produces an electrical signal between 0.2 V and 1 V to represent its current reading, and the sensor is currently producing a 1.2 V signal, the input associated with the sensor can be determined to be unreliable. The input value can optionally be replaced by a derived value (e.g., 1 V, representing a full-scale reading).

In a fifth variant, a pilot control input is determined to be unreliable. In a first example, the input is determined to be unreliable if the system determines that the behavior commanded by the control input may (e.g., will, is likely to, could possibly) cause an undesirable result (e.g., obstacle collision, breach of safety threshold distance from obstacle, breach of mechanical stress threshold, non-compliance with ATC instructions, aircraft stall, etc.). In a second example, the input is determined to be unreliable if the system determines that the control input is potentially spurious (e.g., extreme static input). In a third example, the input is determined to be unreliable if the system determines that the pilot's decision-making abilities may be compromised (e.g., erratic inputs; indications of panic such as biosensor readings, facial expression recognition, vocal emotion recognition, etc.; opposing and/or otherwise incompatible inputs from co-pilots; low cabin air pressure and/or other indications of hypoxia; etc.). This variant can optionally include generating an alert output (e.g., auditory output such as a klaxon and/or spoken alert, visual output such as a flashing light, tactile output such as a stick shaker, etc.) in response to determining the pilot control input is unreliable, which may prompt the pilot to correct the input.

S430 can optionally include assessing input reliability based on the resulting guidance (e.g., guidance determined based on the inputs, such as described below regarding S440). The reliability of a subset of inputs can be assessed based on guidance determined based on the subset (e.g., based only on the subset, based on the subset and additional inputs, etc.). For example, the reliability of a subset of inputs can be assessed by comparing guidance determined based on all available information with guidance determined based on all available information except the subset.

S430 can additionally or alternatively include assessing computational module (e.g., processor) reliability. For example, in a system in which different inputs are received and/or processed at independent processors, S430 can include determining that one or more of the processors is unreliable (e.g., based on determining that one or more inputs associated with the processors are unreliable, such as described above). In response to determining that a processor is unreliable, S430 can optionally include: considering any or all inputs associated with the unreliable processor to be unreliable inputs, reassigning computational responsibilities (e.g., receiving and/or processing inputs using an alternate, reliable processor), and/or compensating for processor unreliability in any other suitable manner. In a specific example, in which a single sensor sends measurements to multiple independent processors (e.g., resulting in multiple inputs that are expected to be identical), S430 can include determining that one or more of the processors is unreliable (e.g., based on discrepancies between the different inputs associated with the sensor, discrepancies between inputs from the sensor and other inputs, etc.; such as described above regarding input unreliability). However, the method can additionally or alternatively include determining and/or compensating for computational failure and/or unreliability in any other suitable manner.

However, determining input reliability S430 can additionally or alternatively include any other suitable elements.

5.4 Determining Guidance.

Determining guidance S440 preferably functions to determine control instructions for aircraft operation. Guidance is preferably determined in response to determining and/or receiving the inputs and/or reliability determinations. Guidance is preferably determined continuously, but can alternatively be determined periodically, sporadically, in response to trigger occurrence (e.g., receiving an operator request to generate guidance, detecting a significant change in flight conditions, etc.), and/or with any other suitable timing. The guidance is preferably determined by one or more on-board processors (e.g., different than or the same as the processors used in other elements of the method), but can additionally or alternatively be determined by a remote processing system and/or any other suitable system.

The guidance can be determined based on the sampled inputs (preferably excluding unreliable inputs), derived values, and/or reliability determinations. In one embodiment, the guidance is determined based further on control policies (e.g., mission plan and/or other control policies, such as described in U.S. application Ser. No. 15/643,205, titled "Vehicle System and Method for Providing Services", which is herein incorporated in its entirety by this reference), such as neural networks and/or Markov control policies.

Determining the guidance S440 can include determining potential issues (e.g., risks such as collisions, low fuel conditions, equipment failure; optimization considerations such as route, speed, efficiency; etc.), scoring or ranking the potential issues (e.g., categorizing the issues and ranking them based on predetermined category rankings, scoring based on predicted negative and/or positive impacts, etc.), and determining guidance based on the scoring or ranking (e.g., ensuring that the aircraft avoids high-risk situations such as terrain collisions, rather than prioritizing fuel savings or bird collision avoidance).

In some variants, determining the guidance S440 is based (in part) on aircraft inspection and/or historical information. For example, determining the guidance can include determining operational guidelines (e.g., safety thresholds) based on the inspection and historical information (e.g., restricting operation to a more conservative set of conditions for an aircraft that is older and/or more likely to undergo failures, while allowing operation under less conservative conditions for an aircraft that is newer and/or less likely to undergo failures; entering an alternate state, such as described below, based on the information; etc.).

Determining guidance S440 preferably includes determining (e.g., independently, such as at different independent processors) a plurality of preliminary guidances S441 and determining master guidance based on the preliminary guidances S442 (e.g., multiplexing the preliminary guidances to generated the master guidance). Each preliminary guidance is preferably determined by a different processor (e.g., dedicated processor) or processor portion, but the preliminary guidances can additionally or alternatively be determined by the same processor or processors. The master guidance is preferably determined by one or more multiplexers (e.g., processor, multiplexer circuit, mechanical multiplexer, etc.) different from the other processors, but can additionally or alternatively be determined using the same processor(s) as used for determining the preliminary guidances S441.

In a first embodiment, S441 includes determining each preliminary guidance based on the same (or substantially the same) set of information (e.g., based on all available inputs and reliability determinations, based on a subset of the available information, etc.). In a first example of this embodiment, each preliminary guidance can be determined using a different algorithm (e.g., autopilot algorithms), by the same processor, different processors, and/or any other suitable processors. In a second example, each preliminary guidance can be determined using the same algorithm, implemented on independent processors and/or other hardware. In this embodiment, the resulting preliminary guidances can possibly be identical or similar, but one or more can alternatively be substantially different (e.g., potentially indicative of a failure in the algorithm and/or hardware responsible for generating the differing guidance). In this embodiment, the master guidance can be generated by combining (e.g., averaging) all or a subset of the preliminary guidances (e.g., subset including only the similar preliminary guidances), selecting one of the preliminary guidances, and/or multiplexing the preliminary guidances in any other suitable manner. Selecting one preliminary guidance can include: for identical algorithms, selecting one of the identical preliminary guidances (e.g., based on a voting scheme); for different algorithms, selecting based on an algorithm score or ranking, such as a predetermined ranking or a score determined based on the inputs, input reliabilities, and/or resulting preliminary guidances (e.g., during high-risk situations, such as potentially imminent terrain collisions, prioritizing algorithms that do not consider lower-risk considerations, such as bird collisions); and/or selecting based on any other suitable criteria.

In a second embodiment, S441 includes determining each preliminary guidance based on a different subset of the available information (e.g., based on different inputs and/or types of inputs). For example, different guidances can be determined based on mutually-exclusive subsets of the information, based on partially-overlapping subsets, based on subsets that contain and/or are contained by other subsets (e.g., two subsets, including and excluding one type of input such as pilot control inputs, respectively), and/or based on any other suitable information.

Determining guidance S440 can optionally include determining one or more guidances (e.g., preliminary guidances, master guidance, etc.) based on historical information, such as recorded behavior of aircraft (e.g., operated by human pilots) under various circumstances (e.g., similar to current aircraft circumstances). For example, the method can optionally include: recording information (e.g., inputs such as described above regarding S410) during human-piloted aircraft operation (e.g., during typical aircraft operation; during real and/or simulated adverse conditions, such as sensor failures, flight control system failures, adverse weather, imminent terrain and/or vehicle collisions, etc.), and/or training guidance-determination algorithms (e.g., using machine learning techniques such as convolutional neural nets) based on the recorded information.

Determining guidance S440 can optionally include determining desired flight control behavior (e.g., based on human control inputs, autonomous control guidances, etc.) and/or determining guidance based on the desired behavior.

Determining guidance S440 can optionally be based on which inputs are unreliable (and/or the extents of their unreliability, such as confidence metrics, duration of unreliability, etc.). For example, the guidance can correspond to controlling the aircraft in an alternate state (e.g., flying the aircraft in an alternate mode, rather than in a normal flight mode) in response to determining that inputs (e.g., any inputs, specific mission-critical and/or desired backup inputs, such as the primary sensor inputs, numerous inputs such as a number of inputs exceeding a safety threshold, etc.) are unreliable. The alternate state(s) can include, for example, an emergency state, danger state, conservative operation state, reduced function state, and/or any other suitable alternate operation states. In specific examples, in the alternate state(s), the guidance can correspond to controlling the aircraft to fly more conservatively, to abort its current mission and proceed to a landing area, to perform an emergency landing, to deploy emergency safety systems, and/or to operate in any other suitable manner. Additionally or alternatively, human pilot input (e.g., on-board pilot, remote pilot) can be requested and/or required (e.g., wherein other conservative actions, such as emergency landing and/or safety system deployment, are performed if human pilot input is not received).

For example, S440 can include, in response to determining that the pilot control input is unreliable: ignoring the input (e.g., not determining pilot control-based guidance, not basing master guidance determination on the pilot control-based guidance, etc.) and instead determining guidance based on a set of inputs excluding the pilot control input (e.g., sensor-based guidance); or determining modified guidance based on the pilot control input (e.g., informed by the commanded behavior but not violating safety concerns). For example, if a pilot control input corresponds to an extreme left bank that could exceed mechanical strain thresholds and/or cause the aircraft to enter a spin, S440 can include determining guidance to perform a less extreme left bank (e.g., that stays within the safety thresholds).

Determining guidance S440 can optionally include determining multiple levels of guidance (e.g., wherein lower-level guidance is determined based on higher-level guidance, preferably along with additional information such as input values). For example, S440 can include determining high-level guidance (e.g., destination, mission parameters, etc.), determining mid-level guidance (e.g., elevation, waypoints, maneuvers, such as for obstacle avoidance, etc.) based on the high-level guidance, determining low-level guidance (e.g., heading, velocity, airspeed, etc.) based on the mid-level guidance, and determining control-level guidance (e.g., throttle settings, control surface settings, etc.) based on the low-level guidance.

For each level of guidance, multiple guidances of that level can optionally be determined independently. Each guidance can be determined based on the same or different information, using the same or different techniques (e.g., algorithms), by the same or different hardware (e.g., processors). For example, S440 can include independently determining multiple (e.g., four) different low-level guidances based on the same mid-level guidance, each using a different algorithm implemented on an independent processor. Each guidance-determining algorithm preferably accepts identically-formed input information (e.g., the higher-level guidance, the sensor inputs, etc.), but can additionally or alternatively accept differently-formatted information. Each guidance-determining algorithm preferably generates identically-formatted output information (e.g., the guidance), but can additionally or alternatively generate differently-formatted information. This can enable addition or substitution of different algorithms and/or hardware (e.g., processors, control hardware such as servos, etc.). S440 can optionally include developing new guidance-determining algorithms during flight (e.g., using machine learning techniques to train a new algorithm, such as based on the performance of the other algorithms).

Determining master guidance S442 can optionally include determining guidance reliability (e.g., of preliminary guidance, master guidance, etc.), wherein higher-level guidance is preferably determined based only on reliable lower-level guidance. Guidance reliability can be determined at the multiplexer, upstream of the multiplexer (e.g., only sending reliable guidance to the multiplexer), and/or by any other suitable elements (e.g., processing elements). Guidance reliability can be determined analogously to input reliability (e.g., as described above regarding S430) and/or in any other suitable manner. In a first example, the method includes classifying the reliability of each preliminary guidance (e.g., using machine learning and/or statistical analysis techniques, based on similarity to a known-reliable guidance, based on clustering, etc.). In a second example, S442 includes independently determining multiple master guidances at three or more independent processors, based on identical preliminary guidance and using identical algorithms, and determining reliability based on voting process.

Determining guidance S440 (and/or any other suitable elements of the method, such as determining input reliability S430) can optionally be performed based on one or more safety corridors (e.g., as described below). For example, guidance that violates a safety corridor and/or input information indicating that it would be safe to violate a safety corridor can be determined to be unreliable (and/or less reliable than other guidances and/or inputs), preferably wherein alternate guidances and/or inputs are used (e.g., instead of the unreliable guidances and/or inputs). One example includes: determining a safety corridor including the aircraft's location; sampling multiple sets of sensor data, each at a different sensor and/or set of sensors of the aircraft; determining multiple guidances (e.g., primary guidance, typically relied on for aircraft operation, and one or more auxiliary guidances, typically used as supplements and/or redundancies to the primary guidance), each based on a different set of sensor data (e.g., each determined at a separate processor, such as independent processors of the aircraft); determining that the primary guidance violates the safety corridor (e.g., is associated with aircraft traversal to a first location outside the safety corridor), preferably determining that the primary guidance (e.g., and the associated sensor, sensor data, and/or processor) is unreliable; determining that an auxiliary guidance does not violate the safety corridor (e.g., is associated with aircraft traversal only to locations within the safety corridor, such as to a second location); and (e.g., based on the determinations) autonomously controlling the aircraft based on the auxiliary guidance (e.g., including controlling the aircraft to fly substantially to the second location) rather than the primary guidance.

However, the guidance can additionally or alternatively be determined in any other suitable manner.

5.5 Controlling Aircraft Operation.

Controlling aircraft operation S450 preferably functions to operate the aircraft (e.g., autonomously). The aircraft is preferably controlled continuously (e.g., throughout flight), and can be controlled in response to receiving guidance (e.g., determined in S440), preferably control-level guidance but additionally or alternatively any other suitable guidance. The aircraft is preferably controlled by one or more on-board processors (e.g., the same as or different than the processors used for other elements of the method), but can additionally or alternatively be controlled by a remote processing system and/or any other suitable processing system. Additionally or alternatively, the aircraft can be controlled by a human operator (e.g., on-board pilot, remote operator, etc.), such as by operating mechanical and/or electronic flight control inputs (e.g., as in typical aircraft flight). S450 can optionally include acting based on aircraft conditions and/or reacting to undesired flight conditions (e.g., as described herein, such as regarding S340 and/or S640) and/or controlling aircraft operation in any other suitable manner.

Controlling aircraft operation S450 can include controlling propulsion mechanisms, flight control surfaces, communication modules, and/or any other suitable aircraft elements, and can additionally or alternatively include controlling remote equipment (e.g., elements apart from the aircraft). For example, S450 can include controlling flight control surface actuators to move the flight control surfaces (e.g., alter collective, cyclic, tail rotor collective, etc.), controlling the rotor engine throttle, and/or controlling a radio to broadcast the aircraft operating conditions. The aircraft elements can optionally be controlled using redundant actuators (e.g., redundant mechanical actuators). For example, the aircraft can include multiple independent (e.g., dissimilar) mechanical systems configured to actuate a single flight control surface.

Aircraft operation is preferably controlled based on guidance (e.g, determined in S440). For example, an autonomous control module can control the aircraft flight surfaces based on the guidance, and/or a human operator can fly according to the guidance (e.g., presented to the human operator). The aircraft is preferably controlled using closed-loop control systems (e.g., adjusting control outputs and/or guidance determinations iteratively based on inputs such as sensor readings), but can additionally or alternatively be controlled using open-loop control systems and/or any other suitable control systems.

Additionally or alternatively, autonomous control can be overridden based on human inputs (e.g., pilot control inputs). For example, autonomous flight system guidance can be overridden based on receiving any pilot control input, receiving pilot control inputs that are incompatible with the autonomous guidance, receiving an override input (e.g., before receiving the override input, autonomous flight system guidance can override human inputs such as described above, whereas in response to receiving the override input, human inputs can override the autonomous flight system guidance), and/or in response to any other suitable trigger. However, controlling aircraft operation S450 can additionally or alternatively include any other suitable elements.

5.6 Variants.

In a first variant of the method 4, each on-board sensor is classified as either a primary or secondary sensor. The method can include: sampling primary sensor inputs S410 from a set of primary sensors (e.g., on-board radar sensors) at an on-board primary input processor; determining that the primary sensor inputs are reliable S430 (e.g., at the primary input processor, at an on-board reliability processor configured to receive data from the primary input processor, etc.); and determining primary guidance based on the primary sensor inputs (e.g., at the primary input processor).

In a first example of this variant, the method further includes failing to sample reliable inputs from the secondary sensors. For example, no inputs can be sampled from the secondary sensors, or inputs can be sampled S410 (e.g., at an on-board secondary input processor) but determined to be unreliable S430 (e.g., at the secondary input processor, reliability processor, a second reliability processor, etc.). In response to determining that the primary sensor inputs are reliable and the secondary sensor inputs are not, the method can include controlling the aircraft S450 based only on the primary guidance (e.g., at a global control processor configured to receive data from both the primary and secondary input processors, at a primary control processor configured to receive data from the primary input processors and not from the secondary input processor, etc.).

In a second example of this variant, the method includes sampling secondary sensor inputs S410, determining that the secondary sensor inputs are reliable S430 (e.g., using the same processor(s) as described above regarding the first example), and determining secondary guidance based on the secondary sensor inputs (e.g., at the secondary input processor). In response to determining that all inputs are reliable, the method can include generating master guidance based on the primary and secondary guidance (e.g., at the global control processor, at a multiplexer, etc.) and controlling the aircraft S450 based on the master guidance (e.g., at the global control processor).

In a second variant of the method, the sensor inputs and/or other inputs are used to supplement human operator situational awareness, and/or to override human operator control inputs. In this variant, the method includes: sampling sensor inputs S410 (e.g., at a sensor input processor); determining that a sensor input is unreliable S430 (e.g., based on incompatibilities between the unreliable input and other sensor inputs, based on a deviation from expected correlations such as correlations determined by S420 and received from the ground station network, etc.); determining sensor-based guidance based on the reliable sensor inputs; presenting the sensor inputs and/or sensor-based guidance to a human operator (e.g., on-board pilot, remote pilot, passenger, etc.); and sampling control inputs S410 from the human operator (e.g., after, concurrent with, and/or before presenting the sensor inputs and/or guidance to the human operator; at a human input processor). This variant preferably includes presenting only reliable sensor inputs (e.g., excluding unreliable inputs), and can optionally include presenting the reliability determination (e.g., informing the pilot which sensors are producing unreliable inputs).

In a first example of this variant, the method further includes: determining S430 that the control inputs are unreliable (e.g., as described above regarding S430; at the human input processor); and controlling the aircraft S450 based on the sensor-based guidance (e.g., ignoring the unreliable control inputs) at a control processor.

In a second example, the method further includes: determining S430 that the control inputs are reliable (e.g., as described above regarding S430; at the human input processor); determining control-based guidance based on the control inputs; generating master guidance based on the sensor- and control-based guidance (e.g., at the control processor, at a multiplexer, etc.) and controlling the aircraft S450 based on the master guidance (e.g., at the global control processor). However, the method can additionally or alternatively include any other suitable elements, performed in any other suitable manner, with any other suitable timing.

6. Contingency Planning

6.1 Operating the Vehicle.

Operating the vehicle S610 is preferably performed under nominal conditions and/or according to a mission plan (e.g., predetermined mission plan). The vehicle is preferably operated autonomously, but can additionally or alternatively be operated by a human pilot, a remote operator, and/or any other suitable entity. S610 can include operating the vehicle before, during, and/or after flight, and/or any other suitable vehicle operation.

The aircraft can be operated as described (e.g., regarding controlling aircraft flight and/or any other suitable elements) in U.S. application Ser. No. 15/643,205, titled "Vehicle System and Method for Providing Services", which is herein incorporated in its entirety by this reference. For example, operating the aircraft can include determining and/or updating an aircraft mission plan (e.g., by the aircraft flight management system, such as by a mission planner module, etc.), revising a planned series of maneuvers (e.g., by the guidance layer, such as by a mission executor module), and/or altering aircraft control signals (e.g., by the control system, such as by an aircraft autopilot). However, the aircraft can additionally or alternatively be controlled in any other suitable manner.

6.2 Planning for Contingencies.

Planning for contingencies S620 can function to enhance situational awareness and/or to enable rapid response to unexpected (e.g., undesired) flight conditions. S620 is preferably performed throughout vehicle operation (e.g., during aircraft flight, before and/or after flight, etc.), and can additionally or alternatively be performed at any other suitable time. For example, S620 can be performed continuously, periodically, sporadically, in response to triggers (e.g., receipt of information, such as updated input information), and/or with any other suitable timing. S620 is preferably performed on-board the aircraft (e.g., by one or more on-board processors), but can additionally or alternatively be determined remotely (e.g., by a remote processing system, such as based on inputs transmitted from the aircraft to the remote processing system, wherein the determinations are subsequently transmitted to the aircraft).

S620 preferably includes determining one or more reactions (e.g., optimal and/or best-known reactions) to undesired flight conditions (e.g., off-nominal conditions, such as emergency conditions). The reactions can include any suitable actions the aircraft is capable of performing (e.g., such as described below regarding S640). For example, the reactions can include controlling the aircraft to fly to and/or land at a target location, to deploy one or more safety systems, to communicate (e.g., with vehicle occupants, with external endpoints, etc.), and/or any other suitable reactions.

Determining the reactions preferably includes, for each undesired flight condition to plan for, evaluating candidate reactions and selecting the optimal reactions. Evaluating a reaction can include assessing factors associated with the reaction, such as determining probabilities of potential results, assessing consequences of the outcomes (e.g., consequences of failure, such as morbidity and mortality, property damage, etc.), determining a metric (e.g., score, rank, classification such as good or bad, etc.) associated with the reaction and/or predicted result, and/or otherwise assessing the outcomes. In some variations, assessing a reaction includes combining metrics associated with potential results (e.g., average of the metric for each potential result, weighted by the likelihood of that result occurring). The reactions can be evaluated based on, for example: flight models (e.g., models determined based on previous flight data, flight physics, etc.), machine learning techniques, heuristics, partially observable Markov decision processes (POMDPs), and/or human (e.g., pilot, passenger, remote operator, etc.) inputs.

Undesired flight conditions can include equipment problems (e.g., failures), unfavorable (e.g., extreme) weather, imminent and/or possible collisions, receipt of emergency inputs, and/or any other undesired conditions. Equipment problems can include: power loss (e.g., engine failure, electrical system failure, etc.), low fuel conditions, sensor failures, structural problems (e.g., chassis damage), control failures (e.g., unresponsive flight control surfaces), communication module failures, and/or any other suitable problems with aircraft equipment. In one example, an emergency input is received from a remote entity, such as a remote operator, ground station, air traffic controller, and/or other (e.g., nearby) aircraft. In another example, an emergency input is received from an aircraft payload, such as an on-board human (e.g., pilot, crew, passenger, etc.; request to land immediately, reroute to avoid collision, etc.) or cargo, such as from a sensor sampling cargo condition (e.g., sensor detecting a temperature increase that could result in damage to a temperature-sensitive payload). However, the emergency inputs can additionally or alternatively be received from any other suitable entities.

The reactions are preferably determined and/or evaluated (and/or re-evaluated) based on the current aircraft and/or environmental status, such as based on information (e.g., data sources, such as data streams) sampled and/or received by the aircraft (e.g., as described above regarding S310 and/or S410) and/or determined (e.g., by aircraft state estimators) based on the sampled and/or received information (e.g., information regarding the aircraft state, the surrounding environment, the results and/or desirability of determined reactions, etc.; such as described above regarding S330, S430, S440, S350, and/or S710, etc.). For example, reactions can be determined and/or evaluated based on any suitable mission parameters and/or state data (e.g., as described in U.S. application Ser. No. 15/643,205, titled "Vehicle System and Method for Providing Services", which is herein incorporated in its entirety by this reference). The reactions can additionally or alternatively be determined and/or evaluated based on current and/or previous sensor measurements (e.g., aerial vehicle sensors, terrestrial sensors, sensors of other aircraft, etc.), human observations (e.g., aerial vehicle occupant, such as pilots, crew, and/or passengers; occupants of other aircraft; terrestrial observers; ground operators; air traffic controllers; etc.), and/or any other suitable data sources described herein (e.g., determined as described elsewhere within this disclosure, such as regarding the embodiments 3 and/or 4 of the method, the method 7 associated with the safety corridor, the data sources, etc.; example shown in FIG. 11), and/or based on any other suitable information.

S620 can optionally include determining uncertainty metrics associated with the determinations of vehicle state, environment state, consequences of the reactions, and/or the desirability of such consequences (e.g., uncertainty metrics based on and/or associated with POMDPs), and/or can include gathering and/or requesting additional information (e.g., in response to determining a high level of uncertainty). In one example, S620 includes altering a sensor configuration or operation scheme to sample additional information (e.g., targeting a scanning sensor at a specific location for which the current information is insufficient). In a second example, S620 includes asking a vehicle occupant to verify (and/or obtain) information, such as verifying the presence of an obstacle at a specific heading, verifying that a planned landing location is unoccupied and safe to land at, and/or verifying the integrity of one or more aircraft components (e.g., verifying that the landing gear is retracted or extended). In a third example, S620 includes asking a remote entity (e.g., dispatch center or ground station, ATC, another aircraft, etc.) to verify, provide, and/or update information, such as weather information (e.g., current conditions, forecasts, etc.), traffic conditions (e.g., air traffic, terrestrial traffic, etc.), and/or availability of emergency services (e.g., at a planned landing location). However, S620 can additionally or alternatively include obtaining any suitable information in any other suitable manner.

Figure 10:
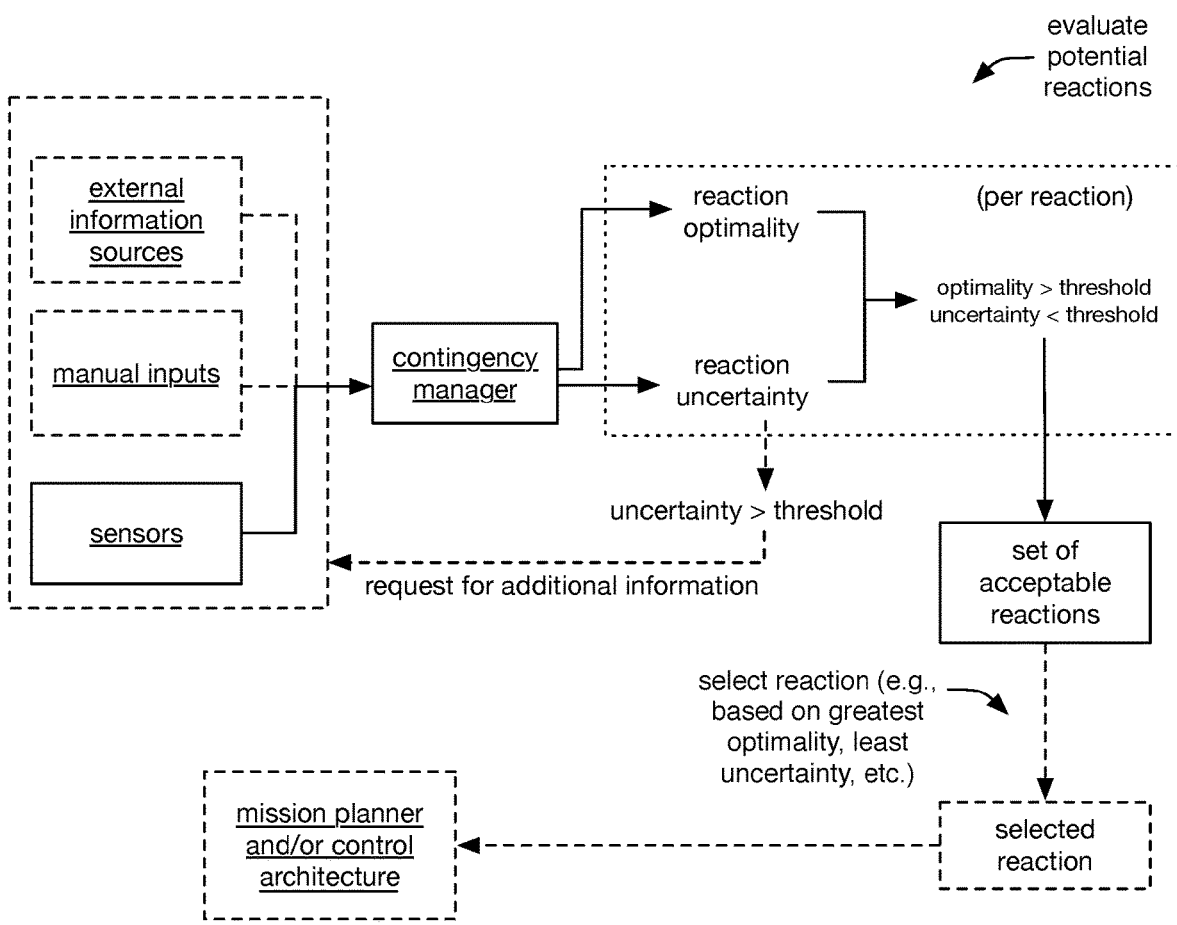
FIG. 10 is a schematic representation of an example of reaction evaluation.

In one example, (e.g., as shown in FIG. 10), the contingency manager determines one or more potential reactions, evaluates the optimality and/or uncertainty associated with one or more of the potential reactions, and selects a set of one or more acceptable reactions based on the evaluation (e.g., selecting all reactions that exceed an minimum optimality threshold and pass under a maximum uncertainty threshold). The potential reactions are preferably determined based on the current aircraft and/or environmental status (e.g., as described above), but can additionally or alternatively include predetermined reactions and/or any other suitable reactions. Uncertainty associated with a reaction can include uncertainty associated with results of the reaction (e.g., expected result of the reaction, a set of likely or possible results of the reaction), such as a probability that a result or one of a set of results will occur, and/or a difference (e.g., difference in resulting aircraft and/or environment state, difference in optimality score, etc.) between possible results (e.g., results within a threshold likelihood, such as within a 65%, 75%, 90%, 95%, or 99% confidence interval, etc.). Uncertainty associated with a reaction can additionally or alternatively include uncertainty associated with the aircraft and/or environmental status. Optimality associated with a reaction can include optimality of the expected result, the best- and/or worst-case result, the best- and/or worst-case result within a threshold likelihood (e.g., within a confidence interval such as 65%, 75%, 90%, 95%, or 99%; result having a likelihood of occurrence greater than a threshold, such as 0.1%, 1%, 5%, 10%, 20%, 30%, etc.), and/or optimality of any other suitable result. The optimality can include a score, a ranking, a classification (e.g., optimal, acceptable, marginal, unacceptable, etc.), and/or any other suitable indication of optimality. This example preferably includes selecting a desired reaction from the set of acceptable reactions (e.g., based on the evaluation). In specific examples, the selected reaction is the reaction with the greatest optimality, the reaction with the least uncertainty, or the reaction minimizing a function of optimality and uncertainty (e.g., a function that increases with uncertainty and decreases with optimality). This example can optionally include requesting additional information (e.g., as described above), such as requesting additional information associated with any reaction for which the uncertainty is greater than a threshold (e.g., maximum uncertainty threshold described above; a second threshold, such as a threshold less than or greater than the maximum uncertainty threshold; etc.). However, the potential reactions can additionally or alternatively be determined, evaluated, and/or selected in any other suitable manner.

S620 can optionally include modifying aircraft operation based on the reaction determinations and/or assessments, such as altering operation (e.g., under nominal conditions) to improve the available reactions. In examples, modifying aircraft operation can include modifying the mission plan, altering planning factors (e.g., penalizing undesirable actions and/or promoting desirable actions), suggesting and/or requesting operation modification, and/or modifying aircraft operation in any other suitable manner.

Determining reactions to aircraft power loss (e.g., in embodiments in which the aircraft includes one or more safety systems, such as an electric motor powered by a battery and configured to drive a rotor of the aircraft, retrorockets, and/or any other suitable propulsion mechanisms) can include assessing aircraft state in relation to a rotorcraft height-velocity curve ("dead-man's curve"), which can indicate safe and/or unsafe rotorcraft operation parameters relating to emergency landings. In one variation, the height-velocity curve is a standard height-velocity curve (e.g., determined by and/or for human pilots) for the vehicle type. In a second variation, the height-velocity curve accounts for the autonomously-controlled nature of the vehicle (e.g., not accounting for human pilot reaction time, such as a 1-second reaction time above the knee of the curve) and/or the safety systems of the vehicle (e.g., factoring in the possible effects of the safety systems, such as retrorockets, parachutes, backup powerplants, etc.). In the second variation, the height-velocity curve can be determined independently (e.g., by flight testing and/or modelling), determined by modifying the standard height-velocity curve for the vehicle, and/or determined in any other suitable manner. However, the height-velocity curve can additionally or alternatively include any other suitable information relating to emergency landing contingencies. The vehicle preferably avoids operation within dangerous regions of the (modified) height-velocity curve (e.g., if the vehicle is operating in and/or planning to enter such a dangerous region, preferably modifying vehicle operation to avoid the dangerous region).

Figure 8A:
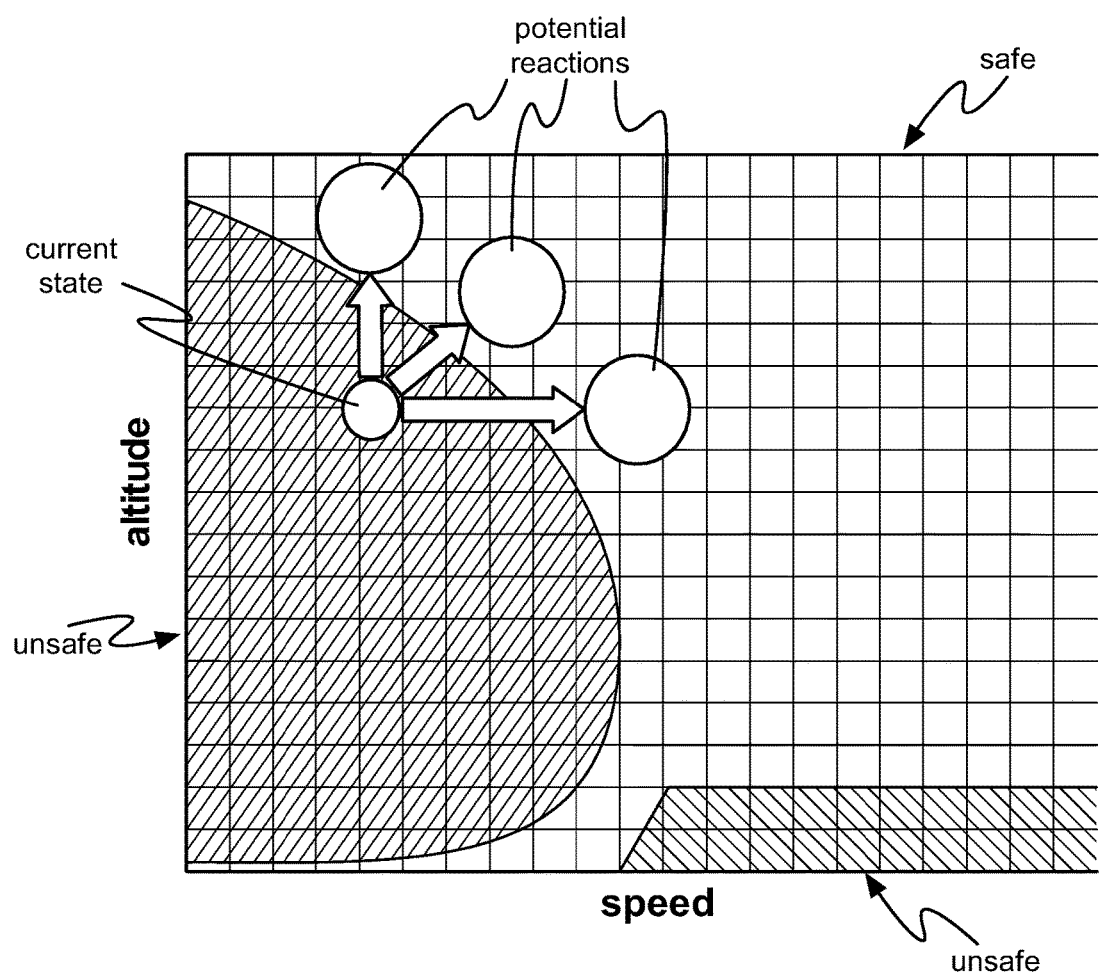
FIG. 8A is an example of a height-velocity curve.

Assessing aircraft state in relation to the height-velocity curve can include determining actions to take immediately in response to aircraft power loss, such as determining how to use the safety systems (e.g., how to escape a dangerous region of the height-velocity curve by using safety systems such as retrorockets and/or backup powerplants). For example, the actions can include causing the vehicle to gain altitude (e.g., at substantially constant airspeed, while increasing airspeed, while decreasing airspeed, etc.) and/or gain airspeed (e.g., at substantially constant altitude, while increasing altitude, while decreasing altitude, etc.), thereby preferably reaching a safe region (in height-velocity space) of the height-velocity curve (e.g., as shown in FIG. 8A). Once a safe region is attained, the aircraft can then be operated to land safely (e.g., by controlling the aircraft during autorotation to achieve safe descent to an acceptable landing location). The reactions can additionally or alternatively include performance of autorotation maneuvers (e.g., immediately following power loss) without use of the safety systems (e.g., in examples in which the aircraft does not require safety system use, such as during operation outside of the dead man's curve).

Determining reactions to aircraft power loss can additionally or alternatively include determining guidance and/or control instructions for deploying other aircraft safety systems (e.g., as described in U.S. application Ser. No. 15/904,082, titled "Safety System for Aerial Vehicles and Method of Operation", which is herein incorporated in its entirety by this reference), such as parachutes. In one example (e.g., in which the aircraft includes an airframe, a rotor rotationally coupled to the airframe about a rotor axis, and/or a parachute mechanically coupled to the airframe), the reactions can include (e.g., in order to safely land the aircraft, such as at an emergency landing location): deploying the parachute in a first parachute anchoring mode; determining a parachute mode transition trigger (e.g., after deploying the parachute in the parachute anchoring mode); and/or controlling the parachute to transition from the parachute anchoring mode to a second parachute anchoring mode different from the parachute anchoring mode (e.g., in response to determining the parachute mode transition trigger).

Figure 8B:
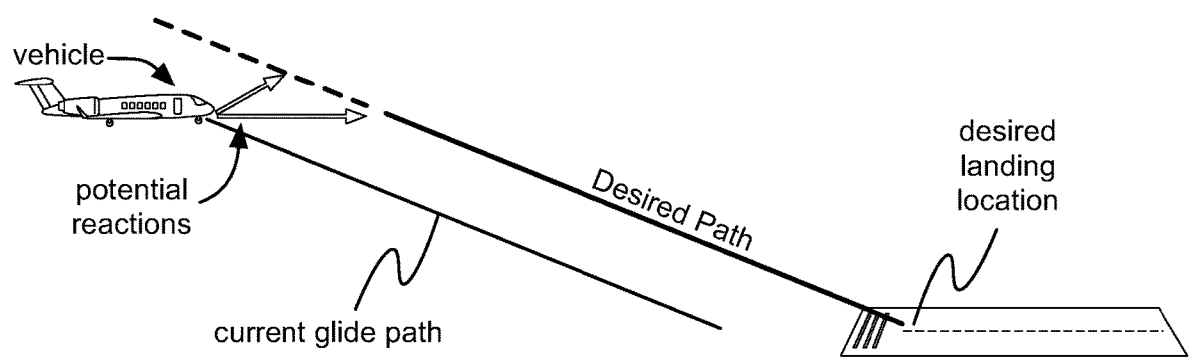
FIG. 8B is an example of an aircraft glide path.

Determining reactions to aircraft power loss can additionally or alternatively include determining a desired aircraft glide path (and/or aircraft control required to achieve the desired glide path), which can include accounting for vehicle state (e.g., airspeed, ground speed, rotor speed, altitude, attitude, heading, weight, center of gravity, damage, etc.), environmental state (e.g.; weather conditions such as wind, precipitation, visibility, and/or turbulence; obstacle conditions such as air traffic, trees, buildings, power lines, etc.; ground conditions such as terrain type and/or condition, damage and/or injury risks to objects and/or people on land; etc.), safety system state (e.g., availability of one or more backup propulsion mechanisms), and/or any other suitable conditions. The glidepaths can include fully powered, partially powered, and/or unpowered glidepaths (e.g., for deadstick landings, such as landings associated with autorotation maneuvers, etc.). For example, determining the desired glide path can include determining desired use of the backup propulsion mechanism(s), such as to maintain aircraft speed (e.g., and travel as far as possible), gain altitude (e.g., while maintaining airspeed, while increasing airspeed, while decreasing airspeed, etc.), alter aircraft heading (e.g., directing the aircraft toward a desired landing location) and/or reduce aircraft bank and/or load factor (e.g., for aircraft performing a banked turn during primary power loss, after a banked turn performed using the backup propulsion mechanism, etc.), and/or alter aircraft trajectory and/or attitude in any other suitable manner. This can, for example, enable the aircraft to reach a desired landing location (e.g., landing location that the aircraft could not reach without use of the propulsion mechanism), such as shown in FIG. 8B, and/or can reduce the need to perform significant banking while the aircraft is unpowered, which can be undesirable (e.g., due to significantly increased stall speed at high bank angles). Determining reactions to aircraft power loss can additionally or alternatively include determining a reaction for performing an emergency landing under power (e.g., using an auxiliary power unit and/or any other suitable backup propulsion mechanism, such as if the auxiliary power unit can provide sufficient power to complete such a landing). The auxiliary power unit(s) can include temporary backup powerplants (e.g., powerplants able to provide propulsion and/or other power for only a limited period of time), such as motors (e.g., electric motors) configured to rotate the rotor(s), preferably the main rotor, retrorockets configured to propel the aircraft, and/or any other suitable powerplants.

Determining reactions to aircraft power loss can additionally or alternatively include determining desired usage of auxiliary power (e.g., prioritizing aircraft systems to power using the auxiliary power unit). In a first variation (e.g., in which the vehicle is already in a safe region of the height-velocity curve, is oriented substantially toward a desired landing location, and can safely reach the desired landing location by gliding without power), the auxiliary power may not be used to power a propulsion mechanism. For example, the auxiliary power can be conserved (e.g., allowing a later powered reaction in response to a change of flight conditions, such as detection of an obstacle with which the aircraft may collide), and/or can be used to power avionics (e.g., non-critical avionics, such as additional sensors), thereby increasing confidence of the state estimation. In a second variation (e.g., in which significant power is required to achieve acceptable flight conditions, such as to intercept a glide path to an acceptable landing location), power provided to non-critical avionics may be reduced or eliminated, so that additional power can be provided to the backup propulsion mechanism. However, auxiliary power can additionally or alternatively be allocated in any other suitable manner.

S620 can additionally or alternatively include determining reactions to imminent aircraft collisions (e.g., terrain collisions) and/or undesirably abrupt landings (e.g., during emergency landing, such as landings necessitated by aircraft power loss), such as determining aircraft landing strategies that may improve expected outcomes for aircraft occupants and/or cargo. Such strategies can include altering the aircraft approach and/or flight profile to increase (e.g., maximize) the crumple zone and/or energy dissipation through the aircraft structure (e.g., crumple zone) and/or safety components, such as by causing the tail to impact first, which may reduce the impulse experienced by the occupants and/or cargo. Such strategies can additionally or alternatively include directing aircraft landing toward compliant landing locations (e.g., locations with accumulations of compliant materials, such as snow and/or pigsty). However, S620 can additionally or alternatively include determining any other suitable reaction(s) to aircraft power loss and/or imminent collision.

S620 can optionally include determining reactions to undesired conditions while the aircraft is not in flight. For example, when the aircraft is on (or within a safe threshold distance of) the ground, S620 can include determining a rotor seizing reaction (e.g., catastrophic rapid shutdown, such as by use of a crumpling brake fixture) that can be employed in response to determination of potential rotor collision (e.g., as described above regarding the safety systems). However, S620 can additionally or alternatively include determining any other suitable reaction(s) to any other conditions (e.g., undesired conditions).

6.3 Detecting Undesired Flight Conditions.

Detecting undesired flight conditions S630 preferably functions to detect developing flight conditions that may be problematic (e.g., undesired flight conditions as described above regarding S620), thereby enabling timely and appropriate responses to such flight conditions. Flight conditions can be determined based on the current aircraft and/or environmental status (e.g., as described above regarding S620), and/or based on any other suitable information. Undesired flight conditions can be detected as described above regarding S330 (e.g., as part or all of performance of S330, concurrent with performance of S330, etc.) and/or in any other suitable manner.

Undesired flight conditions are preferably detected during the course of determining flight conditions (e.g., for use in and/or as part of performing S620). Flight conditions can be determined (e.g., during aircraft flight) continuously, periodically, sporadically, in response to occurrence of a trigger (e.g., extreme value, other aircraft conditions determination, receiving a human input trigger, etc.), and/or with any other suitable timing. Flight conditions are preferably determined on-board the aircraft (e.g., by one or more on-board processors, such as the processors that perform S620 and/or different processors), but can additionally or alternatively be determined remotely (e.g., by a remote processing system, such as based on inputs transmitted from the aircraft to the remote processing system, wherein the determinations are subsequently transmitted to the aircraft).

Flight conditions can be determined using machine learning and/or statistical techniques, heuristic techniques, based on human inputs (e.g., operator assessments of flight conditions), stochastic techniques, deterministic techniques, and/or in any other suitable manner. S630 can optionally include determining (e.g., associated with a specific flight condition determined in S630, associated with the overall status of the aircraft, etc.) one or more: confidence values (e.g., likelihood that the flight condition determination and/or source information is correct), qualitative and/or quantitative assessments (e.g., of a characteristic of the determined flight condition(s), such as risk; determined by a regression and/or classification technique, aircraft dynamics calculation, fuel consumption calculation, risk assessment calculation, etc.), and/or any other suitable aircraft status characterizations. However, the flight condition severity can additionally or alternatively be determined in any other suitable manner (or not be determined).

S630 preferably includes detecting an undesired flight condition for which contingency planning has been performed in S620 (e.g., for which a reaction has been determined). However, the conditions determined in S630 can additionally or alternatively include any other suitable flight conditions, and/or S630 can additionally or alternatively include detecting undesired flight conditions in any other suitable manner.

6.4 Reacting to Undesired Flight Conditions.

Reacting to undesired flight conditions S640 preferably functions to improve outcomes arising from the undesired conditions (e.g., correct the undesired flight conditions, minimize damage and/or injury caused by the conditions, etc.). S640 can be performed in response to detecting an undesired flight condition S630, preferably immediately (e.g., in near-real time), but can additionally or alternatively be performed at any other suitable time. S640 can include implementing the reaction(s) determined in S620 (e.g., the optimal reaction for the detected flight condition), preferably by controlling the aircraft to perform the reactions (e.g., operating the vehicle as described above regarding S610), and can additionally or alternatively include dynamically reallocating electrical and/or computational resources to different processes, and/or reacting in any other suitable manner. Reacting to undesired flight conditions S640 can be performed as described above (e.g., regarding S340 and/or S450, such as part or all of performance of S340 and/or S450, concurrent with performance of S340 and/or S450, etc.) and/or in any other suitable manner.

S640 can optionally include engaging in communication regarding the undesired flight conditions, such as communicating with elements of the control architecture (e.g., mission planner, mission executor, etc.); a remote control entity (e.g., ground station network); an onboard or remote pilot, operator, and/or passenger; a control authority such as ATC; other aircraft (e.g., nearby aircraft); and/or any other suitable entities.

In a first embodiment, S640 includes communicating the flight conditions (e.g., existence of the undesired flight conditions) and/or the corrective actions taken in response (e.g., communicating for informational purposes). In a second embodiment, S640 includes suggesting and/or requesting (e.g., to one or more humans, such as a pilot, passenger, remote operator, etc.) that corrective action be taken. For example, S640 can include generating an alert output (e.g., auditory output such as a klaxon, 'ding', and/or spoken alert; visual output such as a flashing alarm, indicator light, and/or display screen message; tactile output such as a stick shaker; etc.) in response to determining undesired flight conditions, which may prompt the operator to take corrective action. The alert output can be indicative of the aircraft conditions (e.g., "altitude below flight plan" or "altitude is 3200 feet") and/or the suggested corrective actions (e.g., "pull up" or "climb and maintain 5000 feet"), but can additionally or alternatively be indicative of any other suitable information. One variation of this embodiment includes, in response to detecting an undesired aircraft condition: presenting an alert to an operator, informing the operator of the undesired condition and/or the determined reaction; receiving confirmation (e.g., approval of the corrective actions, absence of denial of the corrective actions for a threshold period of time, etc.) from the operator; and, in response to receiving the confirmation, controlling the aircraft according to the corrective actions. A second variation of this embodiment includes providing recommendations (e.g., to perform actions, such as actions that the vehicle cannot perform autonomously) to one or more vehicle occupants. In examples, the recommended actions can include: open aircraft doors prior to emergency landing; perform maintenance and/or mechanical tasks (e.g. manually deploy or retract landing gear, such as if an autonomous landing gear actuator has failed); fasten seatbelt; adjust seat location (e.g., to modify vehicle center of gravity); and/or brace for impact (e.g., in case of an emergency landing).

The method can include continuing to assess conditions (e.g., aircraft state) during performance of S640, preferably determining desired aircraft operation and/or planned reactions based on the additional information (e.g., modifying plans based on changing conditions). In one example (e.g., during performance of S640), in response to detecting a significant, unexpected change in flight conditions (e.g., detecting a possible collision, such as with a previously-undetected obstacle), power and/or computational resources can be allocated to rapidly assessing the flight conditions (e.g., collecting additional data from sensors, computationally analyzing collected data, etc.) and/or determining appropriate reactions to the current conditions (e.g., as described above, such as regarding S620). S640 can be iteratively (e.g., continuously, periodically, etc.) performed based on new, real-time data (e.g., state data, sensor data) during a current instance of S640 performance, be performed a single time (wherein the assessed conditions can be used in future flight sessions), and/or be performed any suitable number of iterations at any suitable time. However, the method can additionally or alternatively include any other suitable elements performed in any suitable manner.

7. Safety Corridor

Figure 4:
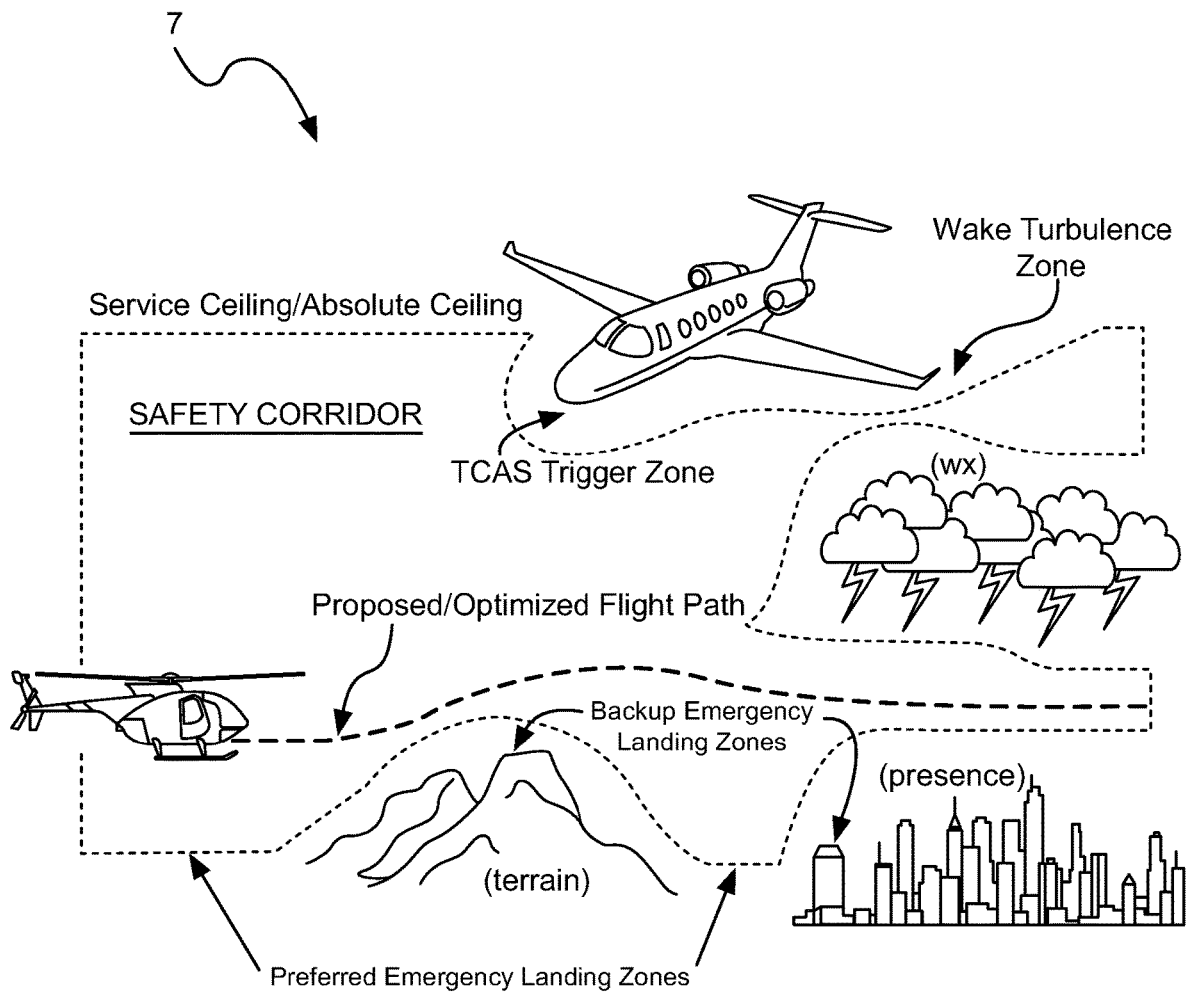
FIG. 4 is a schematic representation of a method for dynamically generating a safety corridor.

As described above and/or shown in the schematic of FIG. 4, embodiments of the system and/or method can be associated with or otherwise inform algorithms associated with a method 7 for defining a safety corridor through which the vehicle can traverse, preferably based on one or more data sources (e.g., data sources as described below, such as safety information associated with one or more regions of space, preferably contiguous regions, from which the safety corridor will be selected), such as statuses of systems of the vehicle in relation to external factors (e.g., associated with weather, associated with terrain, associated with traffic, associated with noise, associated with disturbance of populations within range of the vehicle, etc.). Algorithms associated with determination of the safety corridor can additionally include continuous determination of safe landing zones (e.g., in relation to emergency landings) for the vehicle as the vehicle proceeds along an intended trajectory (e.g., flight path) in an environment.

Generation of the safety corridor is preferably implemented in real time or near real time, such that boundaries of the corridor and other guidance logic aspects are continuously/dynamically updated as the vehicle (e.g., aircraft) moves in an environment. Generation of the safety corridor can be performed during pre-flight phases of operation, during flight phases of operation, and/or during post-flight phases of operation (e.g., in relation to evaluation of actual flight data for optimization of safety corridor generating algorithms). Furthermore, dynamic determination of the safety corridor can be implemented for global path optimization (e.g., for complete definition of a safety corridor) and/or local path optimization (e.g., for definition of an optimized sub-corridor within a full safety corridor).

The method 7 can utilize data sources indicated above (e.g., with respect to elements of the method embodiments 3, 4, and/or 6, such as sampling inputs S310 and/or S410, determining aircraft conditions S330, determining correlations S320, determining input reliability S430, determining guidance S440, determining expected input characteristics S420, planning for contingencies S620, and/or detecting undesired flight conditions S630, etc.; example shown in FIG. 11), such as in order to extract data through defined interfaces with data sources. Additionally or alternatively, data streams and/or sources associated with generation of the corridor can include data sources such as those described below and/or any other suitable information.

Preferably, as described above, the vehicle(s) associated with the method 7 comprise aircraft (e.g., rotorcraft, fixed wing aircraft, etc.); however, the method 7 can additionally or alternatively include or otherwise be associated with non-aircraft vehicles.

The method 7 can include (e.g., based on the data, such as in response to receipt of the data, preferably in near-real time following receipt but additionally or alternatively with any other suitable timing) generation of a corridor in space S710 through which the vehicle can traverse safely, based on analysis of factors derived from the data streams discussed above. In particular, the data streams can be processed to produce factors of interest associated with each or combination of data streams, which can then be used to govern morphological aspects of the corridor in space dynamically (e.g., over time, in relation to changing conditions, etc.). As indicated above, the data associated with external factors and vehicle factors (e.g., performance and failure modes) can be used to continuously generate landing zone options (e.g., for emergency landings), such that the vehicle always has a landing zone option through every phase of travel. Each factor derived from the data stream(s) can have an associated weight or prioritization. For example, factors associated with weather conditions or terrain conditions can be weighted more heavily than factors associated with vehicle noise in relation to proximity to noise-sensitive populations. Furthermore, for each factor derived from the data stream(s), a threshold can be set to increase or decrease safety margins associated with the corridor generated.

The corridor can be a three dimensional corridor in space, or can alternatively be a two-dimensional or one-dimensional corridor. The corridor can be referenced to the vehicle, and in specific examples, can be centered about vehicle, not centered about vehicle, or otherwise displaced from vehicle in any other suitable manner. Block S710 can include generation of multiple corridors in space for the vehicle, thereby providing the vehicle with multiple options for safe travel. For instance, if a first corridor through which the vehicle is traveling has a lower safety factor than a second corridor that is also appropriate for the vehicle (e.g., in terms of vehicle specifications, in terms of environmental conditions, etc.), then the method 7 can include promoting transitioning the vehicle from the first corridor to the second corridor (e.g., autonomously, through a notification to an operator, etc.). As such, as described above, Block S310 can include identification of an optimal "sub-corridor" or lane within the safety corridor, and can include generation of control instructions for the vehicle to transition toward the optimal sub-corridor.

In relation to a first corridor generated for a first vehicle, data generated from the first vehicle traveling within the first corridor can be used to adjust a second corridor for a second vehicle traveling within a related or otherwise overlapping corridor. For instance, if a first aircraft experiences unexpected turbulence within the first corridor, data (e.g., motion data) from the first aircraft can be used to trigger an adjustment to the second corridor for the second aircraft that would otherwise have traveled through the region of unexpected turbulence. In other variations, other weather, traffic, terrain, or other factors determined from vehicles and their respective corridors can be used to adjust, in near-real time, corridors for other vehicles.

In some embodiments, the safety corridor can include takeoff- and/or landing-specific regions (e.g., regions excluded from the safety corridor, except when undergoing a takeoff or landing maneuver). For example, a region near a landing location (e.g., emergency landing location, dedicated landing location, etc.) can be excluded from the safety corridor during normal flight, but can be included in the safety corridor in response to guidance associated with landing at the landing location. However, the safety corridor can additionally or alternatively include and/or exclude any other suitable regions.

In relation to receiving vehicle control inputs (e.g., from an onboard user), as described above, the method 7 can include processing any user-provided control inputs with respect to a generated safety corridor. In one application, the safety corridor(s) generated can be used to provide boundaries beyond which the vehicle cannot pass in response to a control input provided by a user. Additionally or alternatively, in other applications, in response to a control input provided by a user, a corridor can be morphologically tightened (e.g., to have smaller dimensions), thereby increasing safety margins associated with the corridor and limiting user control. Additionally or alternatively, in other applications, in response to a control input provided by a user, a corridor can be otherwise morphologically adjusted in any other suitable manner in response to the control input.

8. Data Sources

Data sources associated with reaction determination and/or evaluation (e.g., as described above regarding S620), safety corridor determination (e.g., as described above regarding the safety corridor), and/or any other suitable elements of the method can optionally include data sources associated with vehicle subsystem statuses (e.g., failure statuses, standby statuses, inactive statuses, normal statuses, etc.) generated from an on-board diagnostic (OBD) system or other system, wherein the data sources can be associated with mechanical systems, avionic systems, powerplant systems, control surface configurations, fuel status (e.g., fuel and/or fuel reserve quantity; rate of consumption, such as faster fuel consumption than expected; etc.), and/or any other suitable systems. As such, potential failure modes of the vehicle can be used to determine and/or evaluate reactions. Additionally or alternatively, the data sources can include performance data (e.g., in relation to operational ceilings, glide slope in different configurations, power settings, etc.).

Additionally or alternatively, the data sources can include weather data, such as: data extracted from National aviation weather sources; extracted from pilot reports and/or any other suitable information received from other pilots and/or aircraft (e.g., direct radio transmission from other aircraft; information shared via intermediaries, such as ground stations and/or ATC; etc.), such as descriptions of current, previous, and/or expected weather conditions; from radar-associated weather data; from ground-based systems (e.g., ground-based sensor systems associated with Meteorological Terminal Aviation Routine reports, from Terminal Aerodrome forecasts, from Area Forecasts, from Model Output Statistical Forecasts, etc.); from satellite systems; from ceilometer devices; and/or from any other suitable source. Additionally or alternatively, the data sources can include data sources associated with altitude and/or environmental conditions at altitude. Such data sources can be used to define weather ceiling associated limits of operation, icing-related levels of operation, regions associated with turbulence/storms, regions associated with low-visibility, winds aloft information, and/or any other suitable regions associated with safe boundaries of aircraft travel. In a specific example, reports (e.g., from other aircraft and/or aircraft occupants) of turbulence and/or clear conditions in one or more regions can be used to inform reaction determination and/or evaluation (e.g., regarding travel through and/or avoidance of the regions).

Additionally or alternatively, the data sources can include radio communication data (e.g., in relation to traffic information, in relation to weather information delivered through radio communications, in relation to TIS-B sources, in relation to FIS-B sources, etc.) extracted from communication audio feeds and processed (e.g., manually, using natural language processing techniques, etc.) to determine information relevant for reaction determination and/or evaluation.

Additionally or alternatively, the data sources can include data sources associated with terrain risk profiles extracted from terrain data. Such data can further be combined with weather data information (e.g., current information, historical information) described above, for instance, using sensor fusion methods, in order to characterize terrain conditions. In variations, terrain and weather data sources can be used to characterize ground conditions associated with one or more of: ground saturation (e.g., where a certain range of ground saturation character would be preferable for rotorcraft, and another range of ground saturation character would be preferable for fixed-wing aircraft, etc.), ground hardness, ground vegetation, ground slope, and/or any other suitable ground conditions within a defined region of interest (e.g., associated with potential landing sites, such as emergency landing sites). For example, ground saturation (e.g., a ground saturation state associated with a location) can be determined based on direct measurements (e.g., saturation measurements, mechanical measurements, optical measurements, etc.) and/or can be determined (e.g., predicted) based on weather (e.g., current and/or previous weather conditions) and/or historical information (e.g., previous ground saturation characterizations). In a specific example, based on a high amount of rainfall in the past week, a swampy region can be predicted to have high ground saturation. However, terrain conditions can additionally or alternatively be determined in any other suitable manner.

Additionally or alternatively, the data sources can include data sources associated with interaction with (e.g., disturbance of) populations within range of the vehicle (e.g., in relation to detection of presence of the aircraft, in relation to disturbances caused by aircraft noise, in relation to ground noise, etc.), wherein such data sources can be extracted from one or more of: records of noise complaints associated with aircraft for a particular geographic location, records associated with aircraft operation interference (e.g., targeting aircraft with weapons, targeting aircraft with laser pointers, etc.) for a particular geographic location, flight operation rules over congested areas, and/or any other suitable data source. Such data sources can additionally or alternatively include information associated with ground traffic (e.g., congestion of nearby roads), gatherings of people and/or property (e.g., associated with a special event), and/or any other suitable factors associated with aircraft interaction with nearby terrestrial entities.

Additionally or alternatively, the data sources can include data sources associated with ground-or other based radar systems (e.g., from air traffic control sources), with extraction of traffic information (e.g., vectors/headings, altitudes, climb rates, descent rates, destination, traffic type, etc.) from radar systems. Additionally or alternatively, data sources associated with generation of the corridor can include data sources from traffic collision avoidance systems (and/or other systems independent of ground-based systems) associated with or not associated with automatic dependent surveillance-broadcast (ADS-B) systems (i.e., ADS-B in equipment, ADS-B out equipment, etc.), wherein data associated with traffic advisories, resolution advisories, and clear of conflict states can be used to determine and/or evaluate reactions. For instance, such data sources can be used for eliminating or otherwise reducing probabilities of collision between different categories of aircraft (e.g., in relation to speed and/or size of other aircraft), and/or eliminating or otherwise reducing probabilities of activating TCAS systems of other aircraft for which traffic avoidance operations would be costly (e.g., in relation to time costs, in relation to fuel costs, etc.). Such data sources can additionally or alternatively be used to prevent aircraft from being subject to wake turbulence of other aircraft, in order to promote smoother flight operations and/or reduce risk of loss of aircraft control due to wake turbulence.

Additionally or alternatively, the data sources can include data sources associated with obstacles (e.g., fixed obstacles, moving and/or moveable obstacles, temporary obstacles, permanent obstacles, etc.). Such obstacles can include, for example, towers, bridges, buildings, overhead lines (e.g., power lines, data lines, etc.), construction equipment (e.g., cranes, scaffolding, pits, etc.), rubble, vehicles, and/or any other suitable obstacles. Obstacle information (and/or any other suitable information) can be determined based on current and/or previous: sensor measurements (e.g., aerial vehicle sensors, terrestrial sensors, sensors of other aircraft, etc.), human observations (e.g., aerial vehicle occupant, such as pilots, crew, and/or passengers; occupants of other aircraft; terrestrial observers; ground operators; air traffic controllers; etc.), construction and/or maintenance documentation (e.g., construction permits, maintenance reports, work logs, obstacle construction reports and/or maps, etc.), historical information, and/or any other suitable information sources. For example, in response to detecting new power lines in a location (e.g., detected by the aerial vehicle, another vehicle operated by the same entity, and independent vehicle, a human observer, etc.), information associated with the power lines is preferably stored (e.g., added to a map, noted in an emergency landing location database, etc.) and/or communicated (e.g., sent to all network vehicles as a hazard report). Thus, during the current aerial vehicle trip and/or in future trips, the presence of the new power lines can be accounted for (e.g., avoiding glide paths that would intersect or come within a threshold distance of the reported and/or detected power line location).

Any or all data sources can be sampled by, received from, and/or otherwise determined based on current and/or previous: sensor measurements (e.g., aerial vehicle sensors, terrestrial sensors, sensors of other aircraft, etc.), human observations (e.g., aerial vehicle occupant, such as pilots, crew, and/or passengers; occupants of other aircraft; terrestrial observers; ground operators; air traffic controllers; etc.), and/or any other suitable sources of information. Reaction determination and/or evaluation can additionally or alternatively be performed based on any other suitable information, and the data sources described herein (and any other suitable information) can additionally or alternatively be used for performance of any other suitable elements of the method.

9. Example Aircraft Control Architecture

Figure 9:
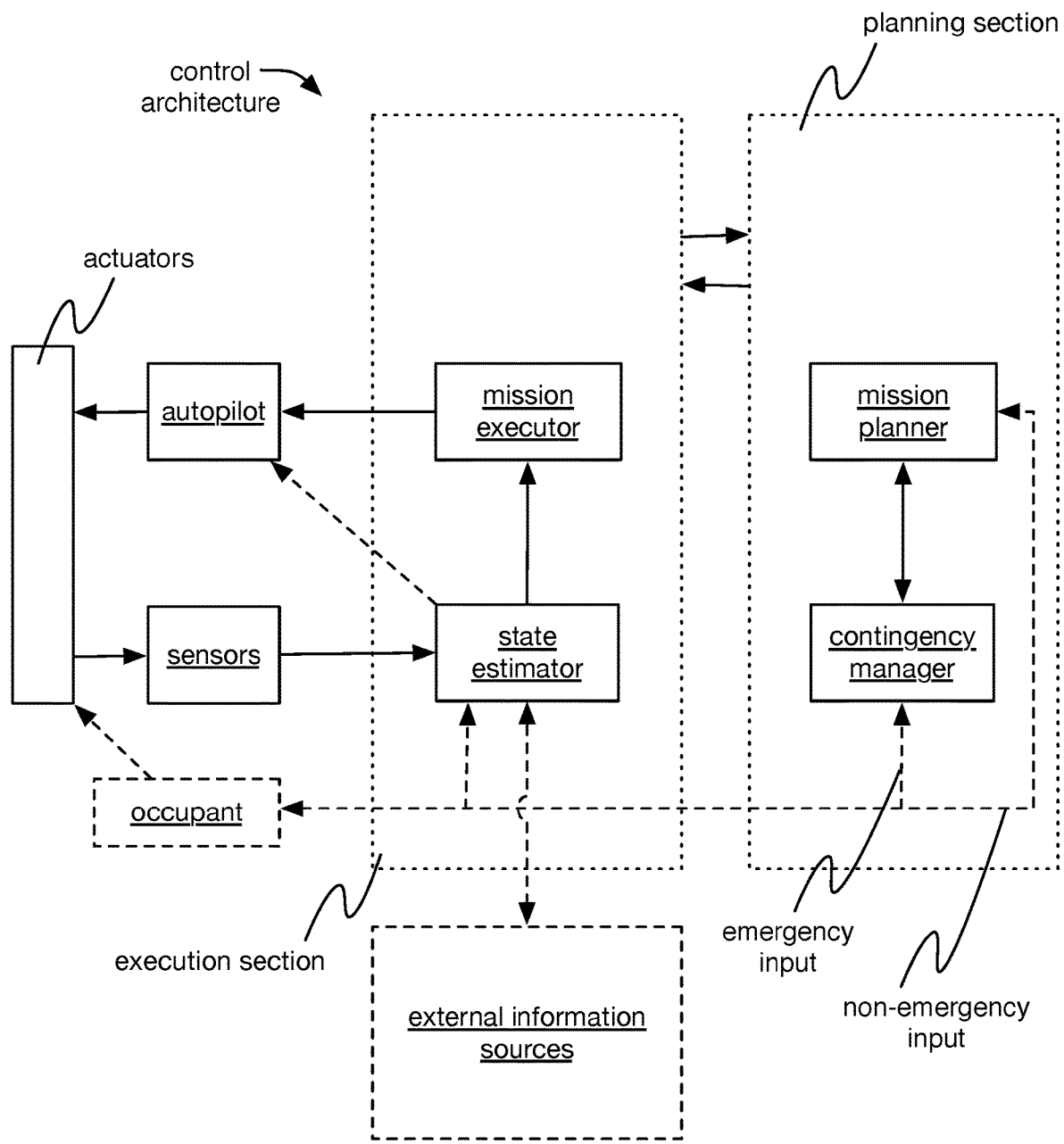
FIG. 9 is a schematic representation of an example control architecture.

One example of a control architecture (e.g., capable of implementing the method) for the aircraft includes a planning section (e.g., internal section) and an execution section (e.g., outward-facing section), and can interface with autopilot mechanisms, sensors, users, external information sources, and/or any other suitable elements, such as shown in FIG. 9.

The planning section can include a mission planner, a contingency manager, and/or any other suitable elements. The mission planner can accept non-emergency inputs (e.g., from one or more users, from a state estimator of the execution section, etc.) and/or provide mission plan information to the contingency manager. The contingency manager can accept emergency inputs (e.g., from the users, state estimator, etc.) and/or provide (e.g., propose, command, etc.) mission modifications to the mission planner. The planning section preferably interfaces with the execution section, such as by providing a mission plan (and/or modifications thereto) to be executed, requesting information, and/or receiving state estimations and/or information about mission performance.

The execution section can include a state estimator, a mission executor, and/or any other suitable elements. The state estimator preferably: consumes input information from sensors, users, and/or external sources (e.g., ATC, weather information sources, ground station network, other aircraft, etc.); determines (e.g., estimates) present conditions (e.g., aircraft state, other flight conditions, etc.), such as described above (e.g., regarding S630); and outputs information (e.g., associated with the state estimations) to the mission executor, autopilot, and/or any other suitable information consumers. The mission executor preferably commands and/or performs the mission determined and/or provided by the planning section (e.g., under nominal conditions, by the mission planner; under off-nominal conditions, by the contingency manager). The mission executor preferably consumes state information (e.g., from the state estimator) and commands setpoints for the autopilot mechanism. The mission executor is preferably vehicle-independent (e.g., can be used with an arbitrary vehicle or arbitrary vehicle of a particular type, such as aircraft or rotorcraft), and is preferably used to control a vehicle-specific autopilot mechanism.

For example, the autopilot mechanism can consume setpoints (e.g., altitude, heading, waypoints, route lines, speed, etc.) and control actuation of aircraft systems (e.g., flight control surfaces, power plants, etc.) in response to receiving the setpoints.

However, the aircraft can additionally or alternatively include any other suitable control architecture (e.g., implementing the method), or include no such control architecture.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein. Herein, "substantially" can be within a predetermined error margin (e.g., 0.1%, 0.5%, 1%, 2%, 3%, 5%, 10%, 15%, etc.) and/or confidence interval (e.g., 99.9%, 99.5%, 99%, 98%, 97%, 95%, 90%, 85%, 80%, 75%, 65%, 50%, etc.) of the referenced value (e.g., predetermined pattern, propulsion characteristics, route, time, numerical value, location, etc.).

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method of aircraft operation, comprising, while autonomously controlling an aircraft to fly:
    determining safety information associated with a region of airspace;
    based on the safety information, an aircraft location of the aircraft, and a destination of the aircraft, determining a safety corridor within the region of airspace, the safety corridor comprising the aircraft location;
    at a first sensor of the aircraft, sampling a first set of sensor data, wherein the first sensor defines a first sensor type; wherein the first sensor is a time-of-flight sensor;
    at a second sensor of the aircraft, sampling a second set of sensor data, wherein the second sensor defines a second sensor type different from the first sensor type; wherein the second sensor is a camera;
    at a first processor of the aircraft, based on the first set of sensor data, determining primary guidance for aircraft control, wherein the primary guidance is associated with aircraft traversal to a first location outside the safety corridor;
    at a second processor of the aircraft, based on the second set of sensor data, determining auxiliary guidance for aircraft control, wherein the auxiliary guidance is associated with aircraft traversal to a second location within the safety corridor;
    determining, at the second processor of the aircraft, that the first location is outside the safety corridor and the second location is within the safety corridor; and
    based on the first location being outside the safety corridor and the second location being within the safety corridor, autonomously controlling the aircraft based on the auxiliary guidance at the second processor, comprising controlling the aircraft to fly to the second location.

2. The method of claim 1, wherein:
    the safety corridor is determined based further on a terrain map indicative of a terrain feature; and
    the first location is less than a minimum distance from the terrain feature.

3. The method of claim 1, wherein:
    the safety information comprises air traffic information indicative of a second aircraft traversing a path; and
    the first location is less than a minimum distance from the path.

4. The method of claim 3, wherein the first set of sensor data is not indicative of the second aircraft.

5. The method of claim 1, further comprising determining a set of emergency landing zones, wherein the safety corridor is determined based further on the set of emergency landing zones, such that, for all space within the safety corridor, at least one emergency landing zone of the set is accessible to the aircraft via deadstick landing.

6. The method of claim 5, wherein determining the set of emergency landing zones comprises, for each emergency landing zone of the set of emergency landing zones:
    based on a terrain map and historical weather data, predicting a terrain saturation state of the emergency landing zone; and
    based on the terrain saturation state, determining that the emergency landing zone is acceptable for emergency landing of the aircraft.

7. The method of claim 5, further comprising, after controlling the aircraft to fly substantially to the second location:
    selecting an emergency landing zone of the set of emergency landing zones; and
    autonomously controlling the aircraft to land within the selected emergency landing zone.

8. The method of claim 1, further comprising, while autonomously controlling the aircraft to fly, determining occupant state data associated with an occupant within the aircraft, wherein the safety corridor is determined based further on the occupant state data.

9. The method of claim 8, wherein the occupant state data comprises physiological state data.

10. A method of aircraft operation, comprising, at an aircraft, while autonomously controlling the aircraft to fly:
    at a first set of sensors of the aircraft, sampling a first set of sensor data, wherein the first set of sensors comprises a first sensor of a first sensor type; wherein the first sensor is a time-of-flight sensor;
    substantially concurrent with sampling the first set of sensor data, at a second set of sensors of the aircraft, sampling a second set of sensor data, wherein:
        the second set of sensors comprises a second sensor of a second sensor type different than the first sensor type; wherein the second sensor is a camera; and
        the second set of sensors does not comprise the first sensor;
    based on the first set of sensor data, determining primary guidance for aircraft control;
    based on the second set of sensor data, determining auxiliary guidance for aircraft control;
    based on the second set of sensor data, determining that the primary guidance is undesirable; and
    in response to determining that the primary guidance is undesirable, controlling the aircraft based on the auxiliary guidance and not based on the primary guidance.

11. The method of claim 10, wherein the aircraft contains a living human.

12. The method of claim 10, wherein:
    the first sensor is operable to directly measure a characteristic;
    the second sensor is not operable to directly measure the characteristic; wherein the outputs of the second sensor type and the first sensor type are related by a correlation; and
    the method further comprises determining the characteristic based on the second set of sensor data using the correlation.

13. The method of claim 12, wherein determining the characteristic based on the second set of sensor data using the correlation comprises regressing the characteristic onto the second set of sensor data.

14. The method of claim 12, wherein:
    the characteristic is a rotational speed of a rotor of the aircraft;
    the first sensor is a rotor speed sensor;
    the second sensor is selected from the group consisting of: an accelerometer, a strain gauge, and a microphone.

15. The method of claim 14, wherein:
    the first set of sensor data defines a measurement of the rotational speed of the rotor of the aircraft at a value below a minimum threshold; and
    the second set of sensor data indicates that the rotational speed of the rotor of the aircraft is above the minimum threshold; wherein the first set of sensor data and the second set of sensor data correspond to disparate indicated rotational speeds of the rotor of the aircraft.

16. The method of claim 12, wherein the first sensor is an aircraft speed sensor and the second sensor is a strain gauge.

17. The method of claim 10, further comprising, at the aircraft, while autonomously controlling the aircraft to fly:
- before determining that the primary guidance is undesirable, operating the aircraft in a normal flight mode; and
- in response to determining that the primary guidance is undesirable, operating the aircraft in a conservative flight mode.

18. The method of claim 10, further comprising, substantially concurrent with sampling the first set of sensor data, at a third set of sensors of the aircraft, sampling a third set of sensor data, wherein:
- the third set of sensors does not comprise the first sensor; and
- determining that the primary guidance is undesirable is performed based further on the third set of sensor data.

19. The method of claim 10, further comprising, while autonomously controlling the aircraft to fly:
- determining safety information associated with a region of airspace; and
- based on the safety information, an aircraft location of the aircraft, and a destination of the aircraft, determining a safety corridor within the region of airspace, the safety corridor comprising the aircraft location;

wherein the auxiliary guidance is associated with aircraft traversal within the safety corridor.

20. The method of claim 19, further comprising determining that the primary guidance is associated with aircraft traversal outside the safety corridor; wherein determining that the primary guidance is undesirable is based further on determining that the primary guidance is associated with aircraft traversal outside the safety corridor.

* * * * *